(12) United States Patent
Doi et al.

(10) Patent No.: US 6,678,399 B2
(45) Date of Patent: Jan. 13, 2004

(54) SUBTRACTION TECHNIQUE FOR COMPUTERIZED DETECTION OF SMALL LUNG NODULES IN COMPUTER TOMOGRAPHY IMAGES

(75) Inventors: Kunio Doi, Willowbrook, IL (US); Takayuki Ishida, Kamo (JP); Shigehiko Katsuragawa, Oita (JP)

(73) Assignee: University of Chicago, Chicago, IL (US)

( * ) Notice: Subject to any disclaimer, the term of this patent is extended or adjusted under 35 U.S.C. 154(b) by 106 days.

(21) Appl. No.: 09/990,311

(22) Filed: Nov. 23, 2001

(65) Prior Publication Data

US 2003/0099388 A1 May 29, 2003

(51) Int. Cl.$^7$ .................................................. G06K 9/00
(52) U.S. Cl. ..................... 382/131; 382/128; 382/257; 382/300; 382/130; 378/62
(58) Field of Search ............................. 382/131, 128, 382/130, 220, 221, 257, 260, 300; 128/922; 600/431, 425; 378/4, 62; 324/307; 702/129

(56) References Cited

U.S. PATENT DOCUMENTS

| | | | | |
|---|---|---|---|---|
| 4,444,196 A | * | 4/1984 | Stein | 600/431 |
| 5,123,056 A | * | 6/1992 | Wilson | 382/132 |
| 5,359,513 A | * | 10/1994 | Kano et al. | 382/128 |
| 5,647,360 A | * | 7/1997 | Bani-Hashemi et al. | 600/425 |
| 5,690,106 A | * | 11/1997 | Bani-Hashemi et al. | 600/425 |
| 5,848,121 A | * | 12/1998 | Gupta et al. | 378/62 |
| 5,881,124 A | | 3/1999 | Giger et al. | |
| 6,067,373 A | * | 5/2000 | Ishida et al. | 382/130 |
| 6,141,437 A | | 10/2000 | Xu et al. | |
| 6,272,366 B1 | * | 8/2001 | Vining | 600/407 |
| 6,336,082 B1 | * | 1/2002 | Nguyen et al. | 702/179 |
| 6,363,163 B1 | * | 3/2002 | Xu et al. | 382/130 |
| 6,404,934 B1 | * | 6/2002 | Lee et al. | 382/260 |
| 6,574,304 B1 | * | 6/2003 | Hsieh et al. | 378/62 |
| 2003/0095696 A1 | * | 5/2003 | Reeves et al. | 382/131 |

* cited by examiner

*Primary Examiner*—Timothy M. Johnson
*Assistant Examiner*—Barry Choobin
(74) *Attorney, Agent, or Firm*—Oblon, Spivak, McClelland, Maier & Neustadt, P.C.

(57) ABSTRACT

A method, system, computer readable medium and apparatus for computerized detection of lung nodules in computer tomography images, by which mask images are created such that subtractions of the mask image from a targeted CT section image reveal or highlight small lung nodules in the target CT section. The mask image is created utilizing the targeted CT section image along with other CT section images generated from the same CT scan. Based on these other section CT images and the targeted CT section image, a mask image can be created that is very similar to the target CT section image, but without the presence of small lung nodules. When the mask image is subtracted from the targeted CT section image, the differences between the mask images and the CT section images reveal small lung nodules. The mask image may be created by linear interpolation or a morphological filtered image.

13 Claims, 29 Drawing Sheets

(a)            (b)

(c)

(a)          (b)

(a) (b)

SUBTRACTION TECHNIQUE FOR COMPUTERIZED DETECTION OF SMALL LUNG NODULES IN COMPUTER TOMOGRAPHY IMAGES The present invention was made in part with U.S. Government support under USPHS Grant CA62625. The U.S. Government has certain rights in this invention.

BACKGROUND OF THE INVENTION

1. Field of the Invention

The present invention also generally relates to computerized techniques for automated analysis of digital images, for example, as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,732,697; 5,740,268; 5,790,690; 5,832,103; 5,873,824; 5,881,124; 5,931,780; 5,974,165; 5,982,915; 5,984,870; 5,987,345; 6,011,862; 6,058,322; 6,067,373; 6,075,878; 6,078,680; 6,088,473; 6,112,112; 6,138,045; 6,141,437; 6,185,320; 6,205,348; 6,240,201; 6,282,305; 6,282,307; 6,317,617 as well as U.S. Pat. No. 6,466,689; 08/398,307 (PCT Publication WO 96/27846); U.S. Pat. No. 5,719,898; Ser. No. 08/900,189; U.S. Pat. Nos. 6,363,163; 6,442,287; 6,335,980; 6,594,378; 6,470,092; Ser. Nos. 09/759,333; 09/760,854; 09/773,636; 09/816,217; 09/830,562; 09/818,831; U.S. Pat. No. 6,483,936; Ser. Nos. 09/860,574; 60/160,790; 60/176,304; and 60/329,322; co-pending application Ser. Nos. 09/990,310, 09/990,377, 10/126,523 PROV, and 10/301,836 PROV; and PCT patent applications PCT/US98/15165; PCT/US98/24933; PCT/US99/03287; PCT/US00/41299; PCT/US01/00680; PCT/US01/01478 and PCT/US01/01479, all of which are incorporated herein by reference.

The present invention includes use of various technologies referenced and described in the above-noted U.S. Patents and Applications, as well as described in the references identified in the following LIST OF REFERENCES by the author(s) and year of publication and cross-referenced throughout the specification by reference to the respective number, in parentheses, of the reference:

LIST OF REFERENCES

1. R. T. Greenlee, M. B. Hill-Harmon, T. Murray, and M. Thun, "Cancer statistics, 200," Ca-Cancer J Clin 51, 15–36 (2001).

2. C I. Henschke, D. I. McCauley, D. F. Yankelevitz, D. P. Naidich, G. Guinness, O. S. Miettinen, D. M. Libby, M. W. Pasmantier, J. Koizumi, N. K. Altorki, and J. P. Smith, "Early lung cancer action project: overall design and findings from baseline screening," The Lancet, 354, Jul. 10, 99–105, (1999).

3. D. P. Naidich, C. H. Marshall, C. Gribbin, R. Arams and D. I. McCauley, "Low-dose CT of the lungs: preliminary observations," Radiology 175, 729–731, (1990).

4. D. F. Yankelevitz, R. Gupta, B. Zhao and C. I. Henschke, "Small pulmonary nodules: Evaluation with repeat CT-preliminary experience," Radiology 217, 251–256 (2000).

5. C. I. Henschke, "Early lung cancer action project: overall design and findings from baseline screening," Cancer 89, 2474–2482 (2000).

6. C. I. Henschke, D. P. Naidich, D. F. Yankelevitz, G. McGuinness, D. I. McCauley, J. P. Smith, D. Libby, M. Pasmantier, M. Vazquez, J. Koizumi, D. Flieder, N. K. Altorki and O. S. Miettinen, "Early lung cancer action project: initial findings on repeat screenings," Cancer 92, 153–159 (2001).

7. C. I. Henschke, D. I. McCauley, D. F. Yankelevitz, D. P. Naidich, G. McGuinness, O. S. Miettinen, D. Libby, M. Pasmantier, J. Koizumi, N. K. Altorki and J. P. Smith, "Early lung cancer action project: a summary of the findings on baseline screening," Oncologist 6, 147–152 (2001).

8. D. Marshall, K. N. Simpson, C. C. Earle and C. W. Chu, "Economic decision analysis model of screening for lung cancer," Eur J Cancer 37, 1759–1767 (2001).

9. S. G. Armato, M. L. Giger, C. J. Moran, J. T. Blackburn, K. Doi and H. MacMahon, "A computerized detection of pulmonary nodules on CT scans," Radiographics 19, 1303–1311 (1999).

10. T. K. Narayan and G. T. Herman, "The use of contrast for automated pulmonary nodule detection in low-dose computed tomography," Med Phys 26, 427–437 (1999).

11. S. G. Armato, M. L. Giger and H. MacMahon, "Automated detection of lung nodules in CT scans: preliminary results," Med Phys 28, 1552–61 (2001).

12. S. Yamamoto, I. Tanaka, M. Senda, Y. Tateno, T. Iinuma and T. Matsumoto, "Image processing for computer-aided diagnosis of lung cancer by CT (LSCT)," Systems and Computers in Japan 25, 67–80 (1994).

13. S. Yamamoto, M. Matsumoto, Y. Tateno et al., "Quoit filter: A new filter based on mathematical morphology to extract the isolated shadow, and its application to automatic detection of lung cancer in X-ray CT," Proc ICPR II 3–7 (1996).

14. T. Tozaki, Y. Kawata, N. Niki, et al., "Pulmonary organs analysis for differential diagnosis based on thoracic thin-section CT images," IEEE Trans Nuclear Science 45, 3075–3082 (1998).

15. Y. Kawata, N. Niki, H. Ohmatsu et al., "Quantitative surface characterization of pulmonary nodules based on thin-section CT images," IEEE Trans Nuclear Science 45, 2132–2138 (1998).

16. A. Kano, K. Doi, H. MacMahon, D. D. Hassell, and M. L. Giger, "Digital image subtraction of temporally sequential chest images for detection of interval change," Med. Phys. 21, 453–461, (1994).

17. T. Ishida, S. Katsuragawa, K. Nakamura, H. MacMahon and K. Doi, "Iterative image-warping technique for temporal subtraction of sequential chest radiographs to detect interval change," Medical Physics, 26, 1320–1329 (1999).

18. T. Ishida, K. Ashizawa, R. Engelmann, S. Katsuragawa, H. MacMahon and K. Doi, "Application of temporal subtraction for detection of interval changes in chest radiographs: Improvement of subtraction image using automated initial image matching," Journal of Digital Imaging, 12, 77–86, (1999).

19. S. Sone, S. Takashima, F. Li, et al., "Mass screening for lung cancer with mobile spiral computed tomography scanner," Lancet, 351, 1242–1245, (1998).

20. Sone S, Li F, Yang Z-G, et al., "Results of three-year mass screening programmed for lung cancer using mobile low-dose spiral computed tomography scanner," Br. J. Cancer, 84:25–32 (2001).

21. S. Katsuragawa, K. Doi, H. MacMahon, L. Monnier-Cholley, J. Morishita, and T. Ishida, "Quantitative analysis of geometric-pattern features of interstitial infiltrates indigital chest radiographs: preliminary results," Journal of Digital Imaging, 9, 137–144 (1996).

22. T. Ishida, S. Katsuragawa, T. Kabayashi, H. MacMahon and K. Doi, "Computerized analysis of interstitial disease in chest radiographs: Improvement of geometric pattern feature analysis," Medical Physics 24, 915–924 (1997).

23. H. Yoshimura, M. L. Giger, K. Doi, H. MacMahon and S. M. Montner, "Computerized scheme for the detection of pulmonary nodules: Nonlinear filtering technique," Invest Radiol 27, 124–129 (1992).

The entire contents of each related patent and application listed above and each reference listed in the LIST OF REFERENCES, are incorporated herein by reference.

2. Discussion of the Background

Recently, medical professionals have been able to diagnose lung cancer with the aid of computed tomography (CT) imaging systems. A CT system is a X-ray device used to produce cross sectional images of organs. For instance, a CT system may be used to produce a series of cross sectional images of the human lung. Radiologists are able to examine these series of cross sectional images to diagnose pulmonary nodules.

Lung cancer is the leading cause of cancer mortality for American men and women. Currently the five-year survival rate for patients with lung cancer is less than 15%, whereas this rate for patients with localized and small cancer is improved at 48%. Accordingly, the detection of localized and small lung nodules is an important task for radiologists. Currently, however, only 15% of lung cancer patients are diagnosed at an early stage. For increasing the detection rate of early lung cancer, low-dose helical computed tomography (CT) has been employed in screening programs. Low-dose CT (LDCT) has been shown to be more sensitive than conventional chest radiographs in the detection of small lung nodules. It is therefore desirable for LDCTs to be used during initial examinations for the early detection of lung cancer in screening programs.

However, it is still difficult to detect very subtle nodules. Further, the interpretation of a large number of CT images is time-consuming for radiologists.

SUMMARY OF THE INVENTION

The above-mentioned deficiencies in the difficulty to detect very subtle nodules and the interpretation of a large number of CT images are mitigated by the embodiments of the present invention, which relate to a fully automated computerized scheme for the detection of subtle nodules by use of a novel subtraction CT technique. Embodiments of the present invention comprise creating a mask by linear interpolation of two warped CT section images. Other embodiments of the present invention comprise creating a mask image from a morphological filtered image, which is created from a plurality of CT section images.

In embodiments of the present invention, mask images are created for a particular CT section image. Mask images created such that subtraction of the mask image from the targeted CT section image reveals or highlights small lung nodules in the targeted CT section. In general, the mask image is created utilizing the targeted CT section image along with other CT section images generated from the same CT scan. Based on these other CT section images and the target section image, a mask image can be created that is very similar to the targeted CT section image, but without the presence of small lung nodules. Accordingly, when the mask image is subtracted from the targeted CT section image, the differences between the mask image and the targeted CT section image should reveal the small lung nodules. There are several embodiments of the present invention that accomplished the creation of a mask image.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

FIG. 5($b$) is an illustration of a subtraction CT technique with 3D morphological filter.

FIG. 5($c$) is an illustration of a 3D morphological filter followed by a 2D morphological filter.

DETAILED DESCRIPTION OF THE PREFERRED EMBODIMENTS

Figure 1:
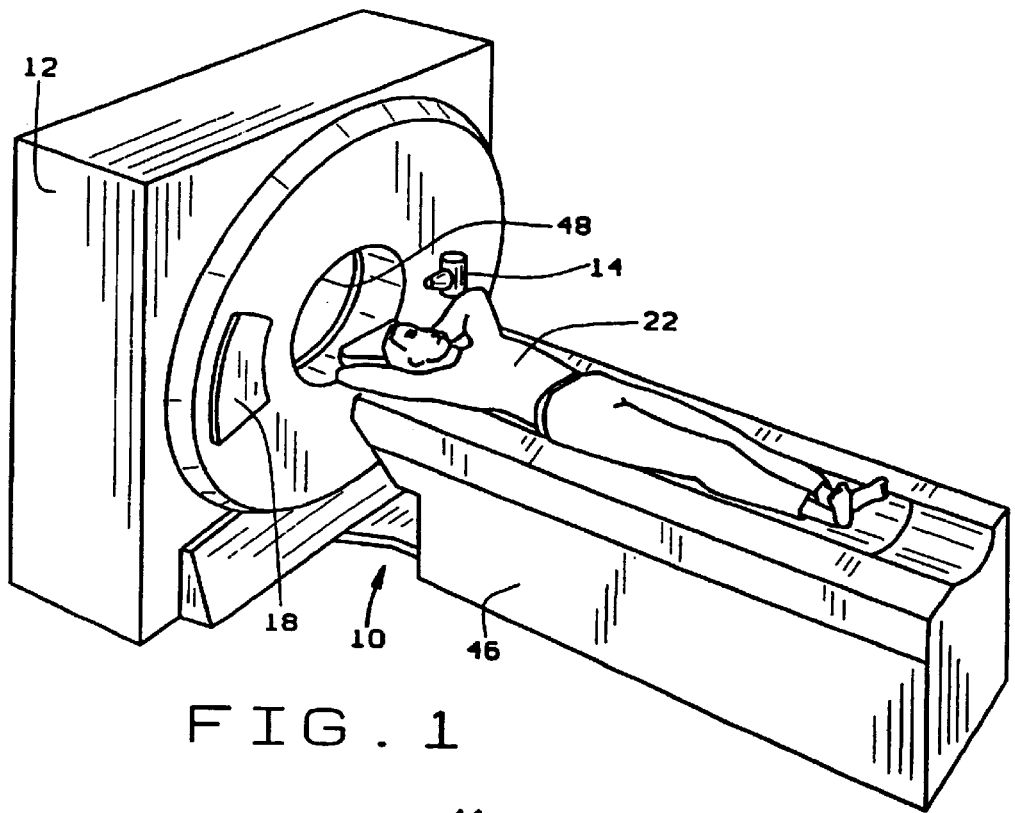
FIG. 1 is a pictorial view of a CT imaging system.
Figure 2:
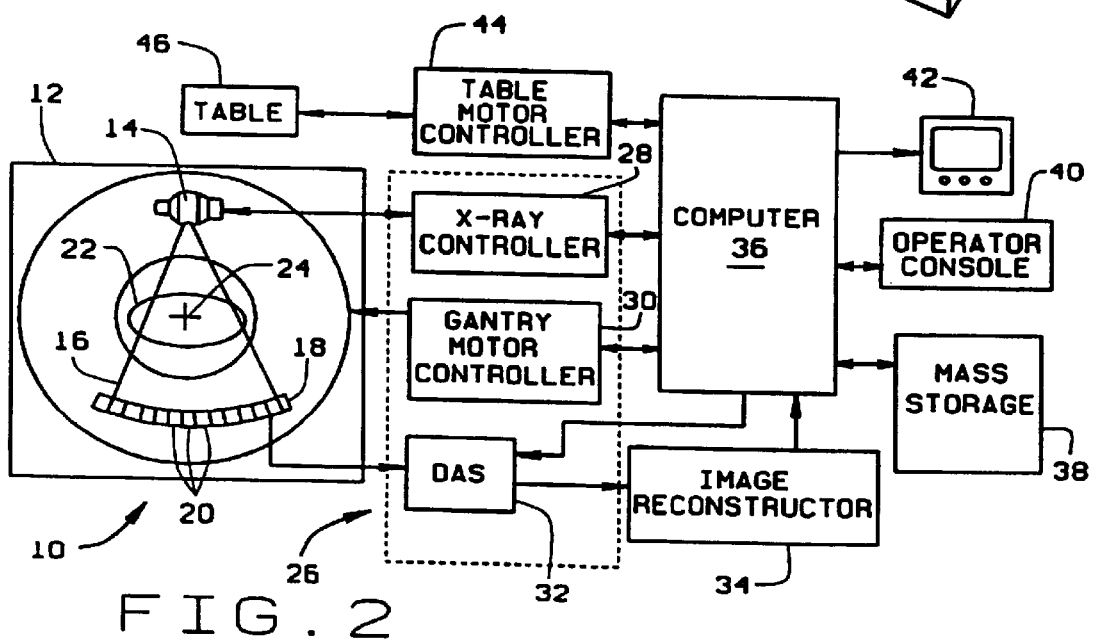
FIG. 2 is a block schematic diagram of the system illustrated in FIG. 1.

Referring to FIGS. 1 and 2, an exemplary computed tomography (CT) imaging system 10 is shown as including a gantry 12. Gantry 12 has an X-ray source 14 that projects a beam of X-rays 16 toward a detector array 8 on the opposite side of gantry 12. Detector array 18 is formed by detector elements 20 which together sense the projected X-rays that pass through a medical patient 22. Each detector element 20 produces an electrical signal that represents the intensity of an impinging X-ray beam and hence the attenuation of the beam as it passes through patient 22. During a scan to acquire X-ray projection data, gantry 12 and the components mounted thereon rotate about a center of rotation 24.

Rotation of gantry 12 and the operation of X-ray source 14 are governed by a control mechanism 26 of CT system 10. Control mechanism 26 includes an X-ray controller 28 that provides power and timing signals to X-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized X-ray data from DAS 32 and performs high speed image reconstruction. The reconstructed image is applied as an input to a computer 36 which stores the image in a mass storage device 38.

Computer 36 also receives and supplies signals via a user interface, or graphical user interface (GUI). Specifically computer receives commands and scanning parameters from an operator via console 40 that has a keyboard and a mouse (not shown). An associated cathode ray tube display 42 allows the operator to observe the reconstructed image and other data from computer 36. The operator supplied commands and parameters are used by computer 36 to provide control signals and information to X-ray controller 28, gantry motor controller 30, DAS 32, and table motor controller 44.

The Applicants evaluated a total of 17,892 examinations on 7,847 individuals as part of an annual lung cancer screening by use of LDCT in Nagano, Japan. In the screening program, a mobile CT scanner (W950SR, Hitachi, Tokyo) was used for scanning the chest with a tube current of 50 mA in 1996, and 25 mA in 1997 and 1998, a scan time of 2 sec./rotation of the x-ray tube, a table speed of 10 mm/sec., 10 mm collimation, and a 10 mm reconstruction interval. Among 7,847 examinations, there were 819 scans in which suspicious lesions were detected. Diagnostic work-up examinations were performed on 780 scans within 3 months of LDCT screening by use of conventional chest radiographs, diagnostic CT including thin-section high-resolution CT (HRCT), and follow-up CT examinations at 3, 6, 12, 18, and 24 months, as needed. The CT scanner (CT HiSpeed Advantage, GE, Milwaukee, Wis.) was used for scanning the entire lung with standard scanning parameters: 200 mA tube current, 1 sec./tube rotation, a table speed of 10 mm/sec., and 10-mm collimation. In 780 scans, 605 patients with 747 lesions had suspicious pulmonary nodules (<30 mm) in LDCT. There were 488 patients with one nodule, 99 patients with two nodules, 13 patients with three nodules, four patients with four nodules, and one patient with six nodules. Seventy-six lung nodules were confirmed pathologically as primary lung cancer. In this study, ten lung cancer cases with subtle or very subtle solitary nodules were selected as small and difficult cases from the 76 lung cancer cases. Each case included 31 section images with a 512×512 matrix size. The Hounsfield units in the original CT sections were converted to 10-bit gray-level images.

Embodiments of the present invention relate to automated computerized detection of small lung nodules in CT images that include two steps. The first step is to produce subtraction CT images for the enhancement of subtle and small lung nodules on CT images based on a CT image subtraction technique with iterative image-warping. The second step is to detect these nodules on subtraction CT images based on an automated computerized technique by use of thresholding and feature analysis on nodule candidates.

Figure 3:
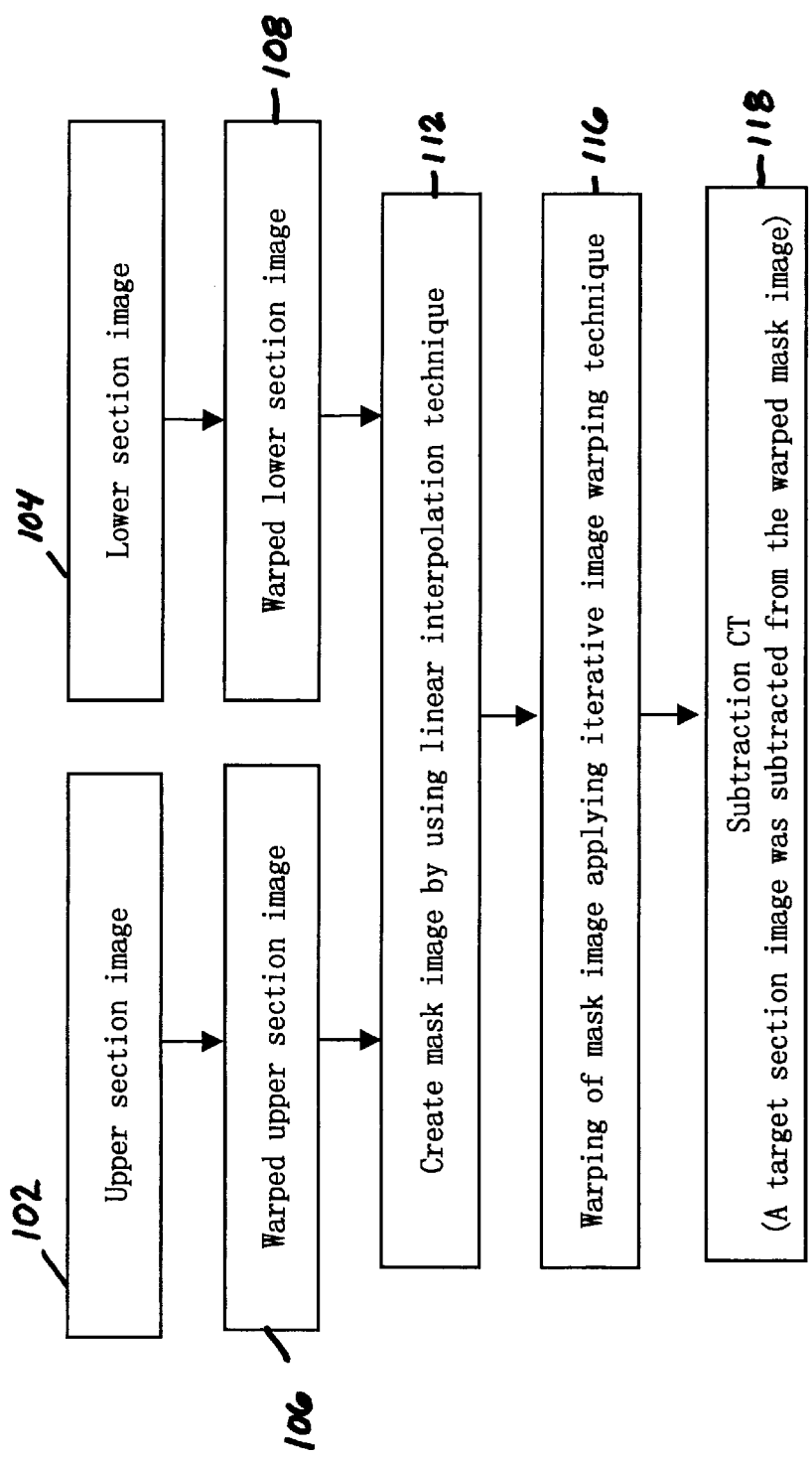
FIG. 3 is a flow chart illustrating the overall scheme for a subtraction based on a linear interpolation technique.

The basic configuration of subtraction CT consists of two techniques, i.e., one for the creation of a mask image which is to be subtracted from a target section image, and the other for image subtraction by applying iterative image-warping. In order to obtain a mask image for subtraction, the Applicants have developed two different methods. The first method is shown in FIG. 3 as a linear interpolation method. The second method is shown in FIG. 4 as a 3-dimensional (3D) morphological filtering plus a line enhancement filtering method.

FIG. 3 shows the overall scheme for the subtraction CT based on the linear interpolation method. The target section image for subtraction and the two sections 102, 104 immediately above and below the target image are used for creation of the mask image. First, each of the upper and lower section images of a given target section image is warped to match the target section image by use of the iterative image-warping technique as shown in blocks 106 and 108. The normal structures extending over multiple slices, such as ribs, vessels, and heart in the target section image and the upper 102 (or the lower 104) section image, are matched by the image-warping technique. The use of the image-warping technique can reduce the misregistration artifacts in the subtraction CT image caused by a small difference in normal structures appearing in two adjacent slices. Then, each pixel value of a mask image is obtained by a linear interpolation technique with the corresponding pixel values in the warped upper and lower images, as shown in block 112. The iterative image-warping technique is then applied to produce an improved mask image for further reduction of misregistration artifacts on the subtraction CT image, by repeating the use of the warping technique on the target section image with the warped upper and lower images, as shown in block 118. Thus, the subtraction CT image is obtained by subtracting of the target image from the iteratively warped mask image. Because, with this method, three section images are used to provide a subtraction CT image, we can obtain 29 subtraction CT images for one case, except for the top section image and the bottom section image.

Figure 4:
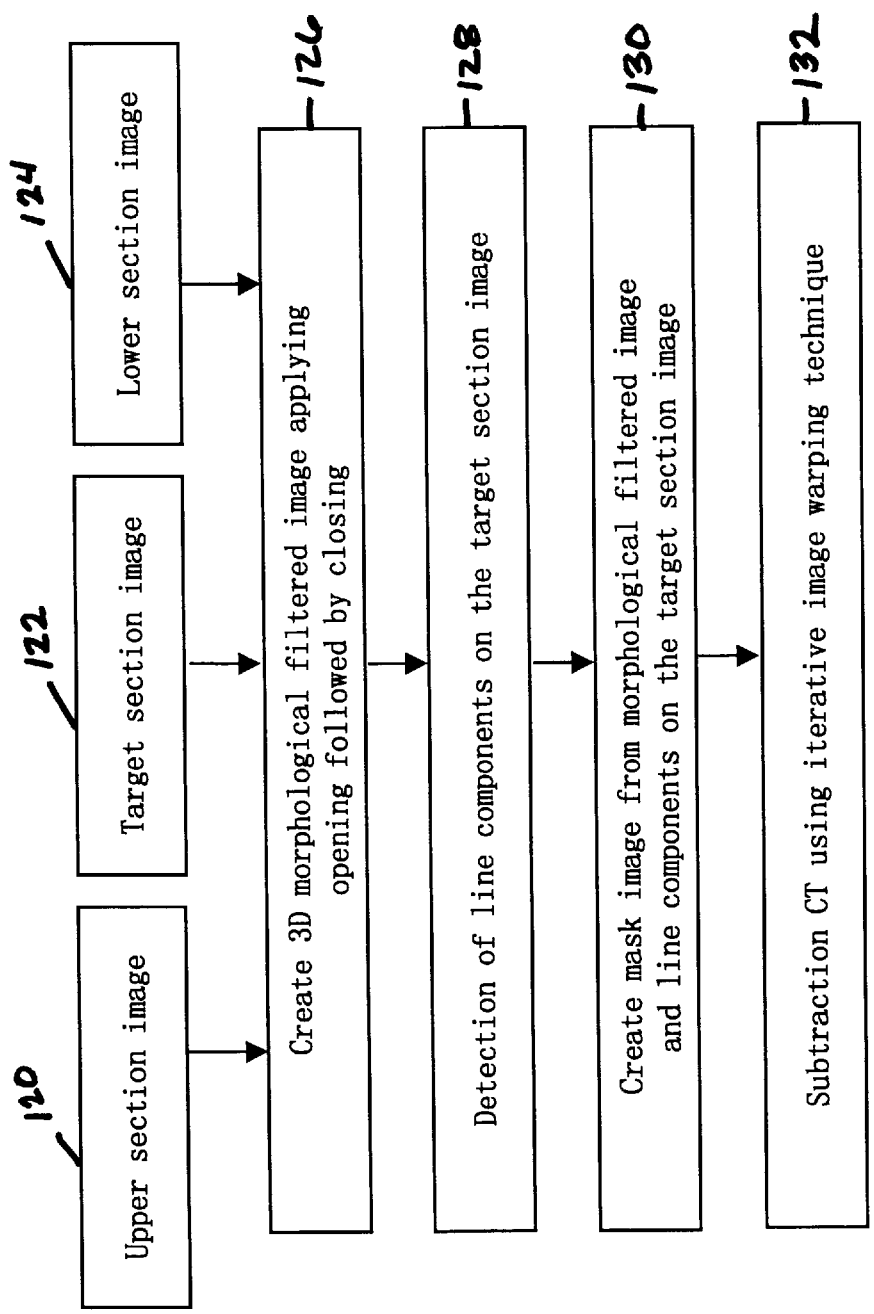
FIG. 4 is a flow chart illustrating the overall scheme for a subtraction CT based on a morphological filter and line enhancement filter technique.

FIG. 4 shows the overall scheme for the subtraction CT based on the 3D morphological filtering technique. With the morphological filtering plus the line enhancement filtering technique, the mask image for the subtraction CT is obtained from three CT section images 120, 122, 124. First, the 3D morphological filter is applied to two sections which include the target section image and the upper or lower section image, as shown in block 126. We employed opening and closing operations that are performed by the combination of dilation and erosion.

Figure 5A:
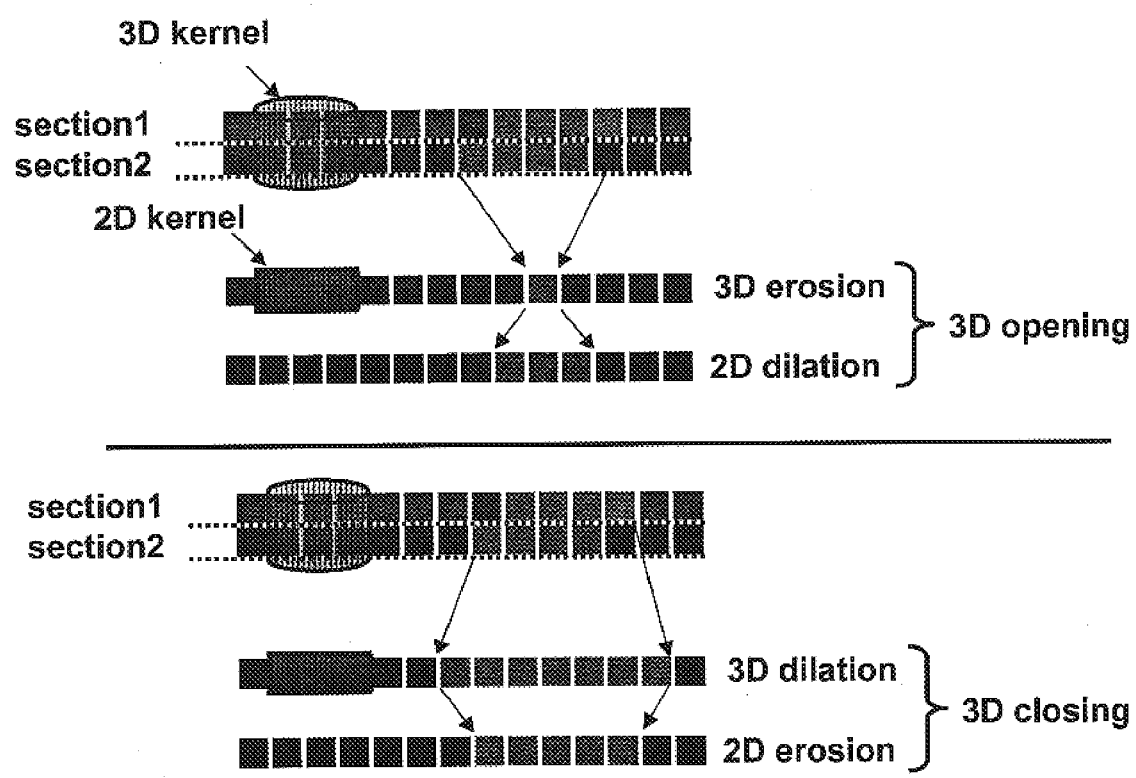
FIG. 5($a$) is an illustration of a 3D morphological filter with opening and closing.

As illustrated in FIG. 5(a), the shape of the kernel for the 3D morphological filtering is cylindrical over the two sections. The shape of the kernel for the 2D morphological filtering is circular. As the cylindrical kernel scans over all pixels of two section images, the maximum value or the minimum value in the kernel is obtained for dilation or erosion, respectively, as the output value for the mask image, which is then subjected to a 2D morphological operation. The 3D opening operation is defined here as the 3D erosion followed by the 2D dilation, whereas the 3D closing operation is defined as the 3D dilation followed by the 2D erosion.

Figure 5B:
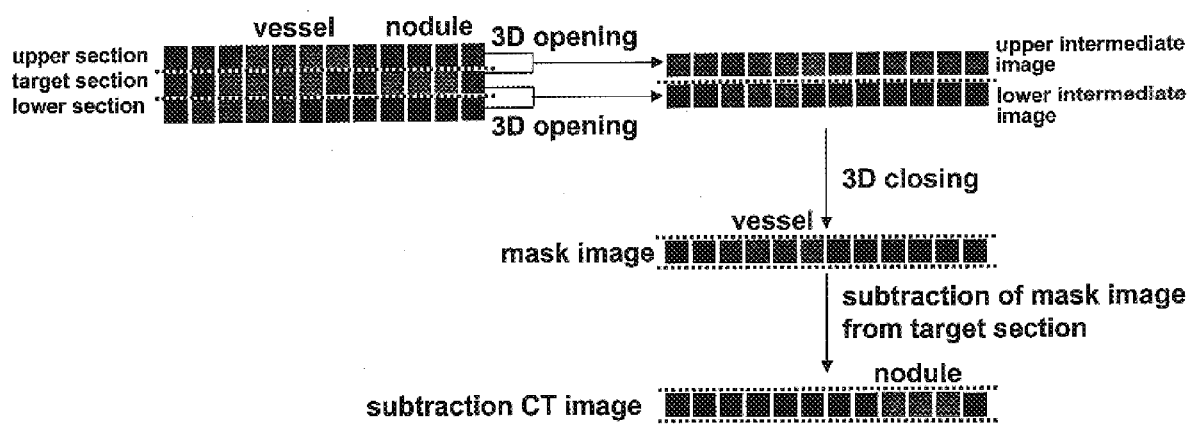

As shown in FIG. 5(b), an upper intermediate image is obtained by the 3D opening operation for the upper and target sections, and a lower intermediate image is also obtained by the 3D opening operation for the target and lower sections. Then, a mask image is created by the 3D closing operation for the upper and lower intermediate images. It should be noted that the mask image can retain a vessel opacity which is basically the same as that on the target section, whereas a small nodule can be removed. Therefore, the subtraction of the mask image from the target section can reveal only a nodule opacity without the vessel opacity.

Figure 5C:
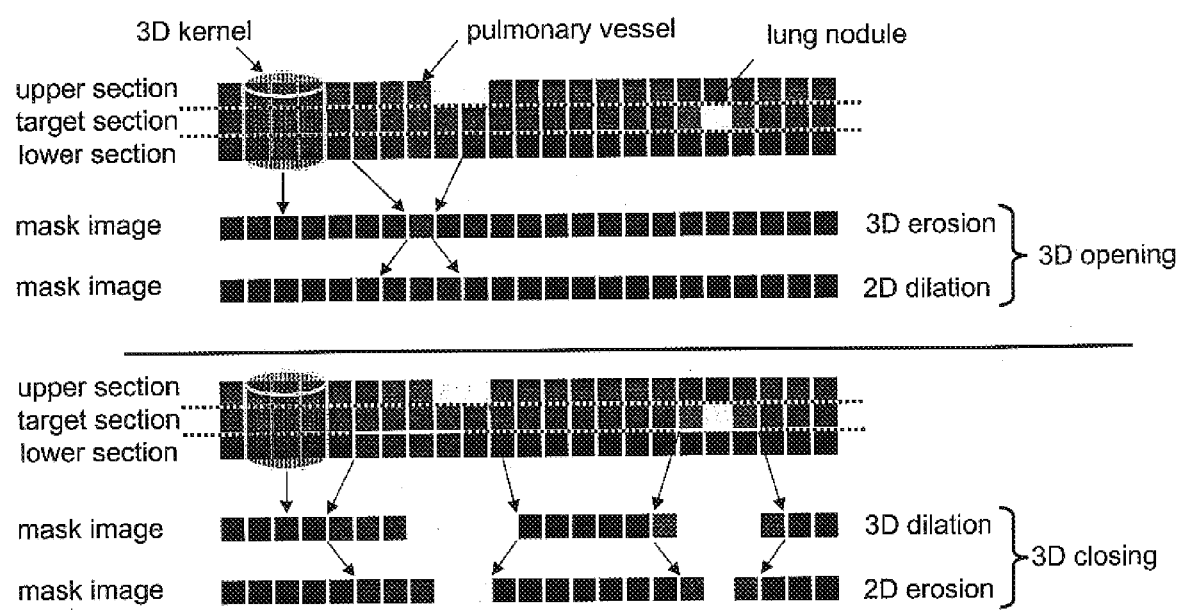

In embodiments of the present invention, a 3×3×3 kernel 3D morphological filtering technique shown in FIG. 5(c) is used to obtain mask image. In these embodiments, 3D erosion filtering with a 3×3×3 kernel followed by 2D dilation is performed.

Referring back to FIG. 4, the line components included in the target section image are detected and enhanced by use of a line enhancement filter, as shown in block 128. The line components included with large output values are detected by thresholding of the line-enhanced image. Then the length and the circularity of the initial candidates of the line components are determined for elimination of the short and rounded components. The pixel values over the areas of detected line components on the target section image are replaced by those on the morphological filtered image, as shown in block 130. Finally, the subtraction CT image is obtained by subtracting of the target section image from the warped mask image by using the iterative image-warping technique, as shown in block 132. Because this method uses three section images to yield a subtraction CT image, 29 subtraction CT images can be obtained for one case in the same way as by the linear interpolation method.

Figure 6:
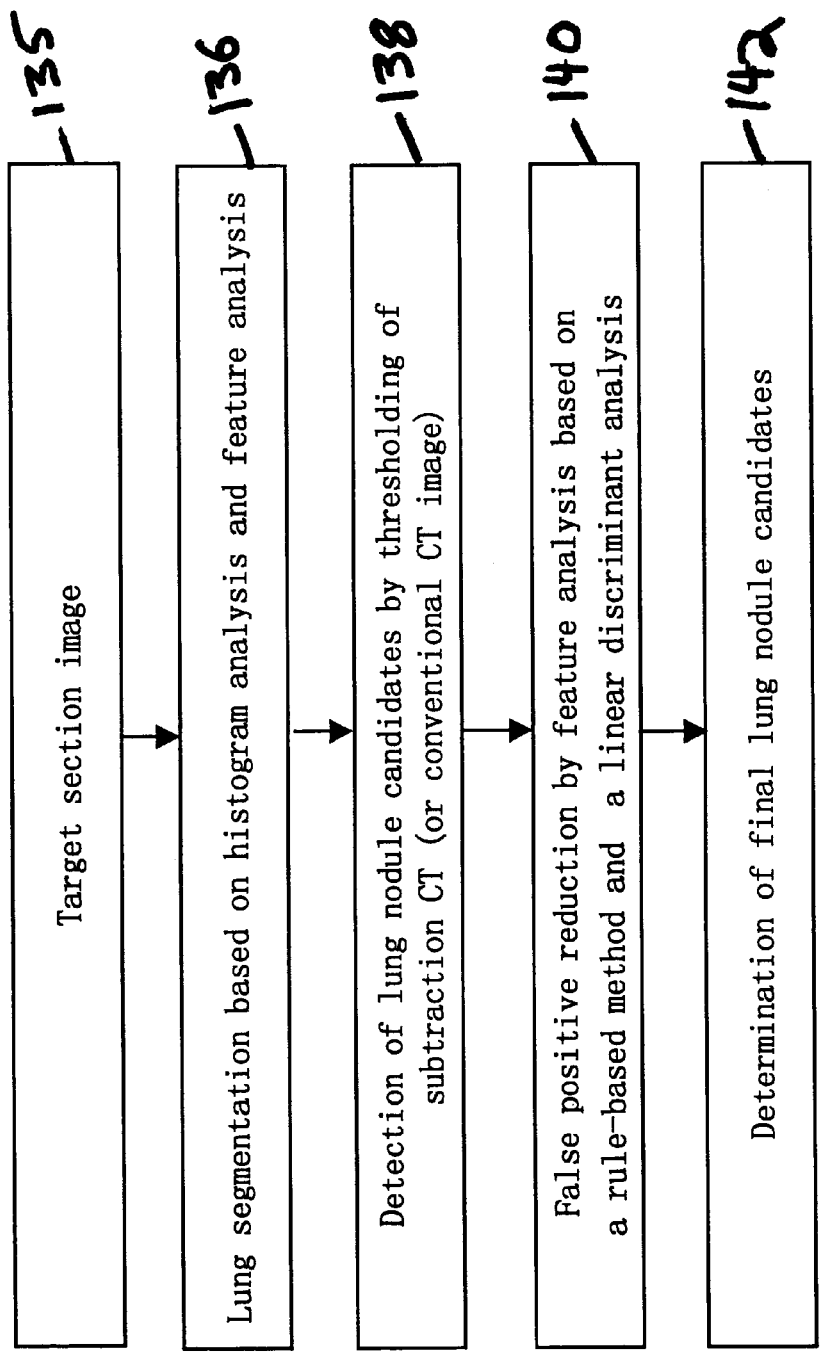
FIG. 6 illustrates the overall scheme for computerized detection of lung nodules on subtraction CT and conventional CT images.

FIG. 6 illustrates the basic scheme for the computerized detection of lung nodules is applicable to both subtraction CT images and conventional CT images. In this scheme, a lung segmentation technique based on analysis of the pixel value histogram is first performed for extraction of lung regions, as shown in block 136. Then the initial nodule candidates in the lungs are identified by thresholding of the subtraction CT image, as shown in block 138. Some false positives are eliminated by analysis of a number of features by use of the area, the circularity, the average pixel value, and the standard deviation (SD) of pixel values of the initial candidates, as shown in block 140. Then linear discriminant analysis (LDA) is applied for further elimination of false positives, thus yielding the final candidates of lung nodules, as shown in block 142.

The Applicants compared the overall performance for the computerized detection of lung nodules based on subtraction CT images, obtained by both the linear interpolation method and the morphological filtering method, and also for conventional CT images. For the detection of lung nodules on conventional CT images, a thresholding technique is applied after CT images are enhanced by use of a Gaussian filter with a 15×15 matrix size and an SD of 8 pixels, which was useful for improving the performance.

Figure 7:
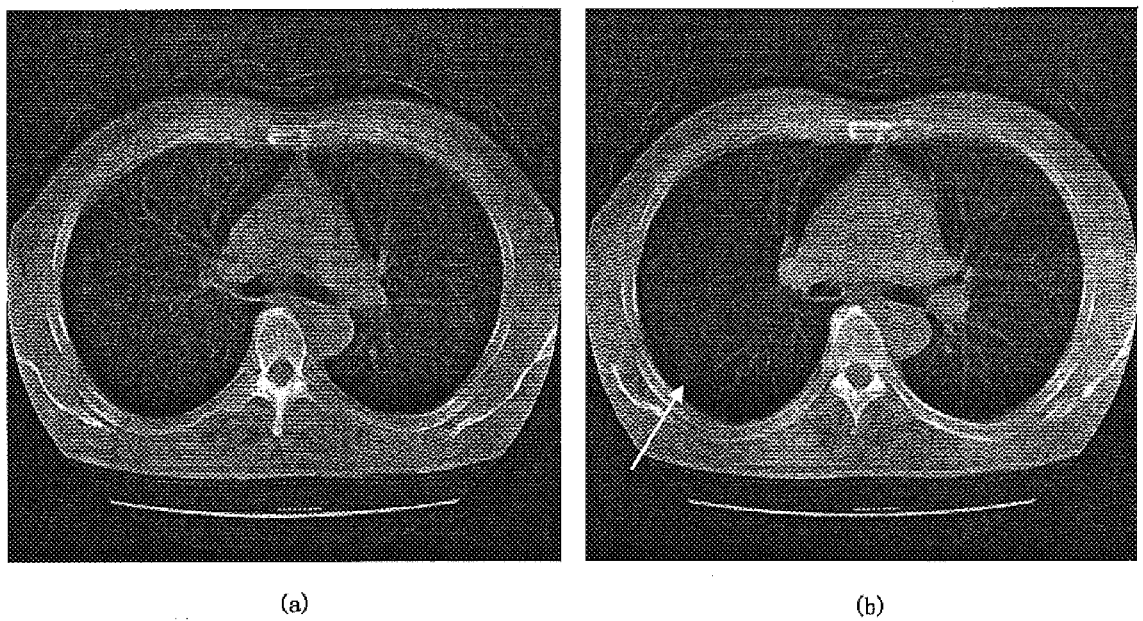
FIGS. 7($a$)–7($c$) shows exemplary original CT images.
Figure 7:
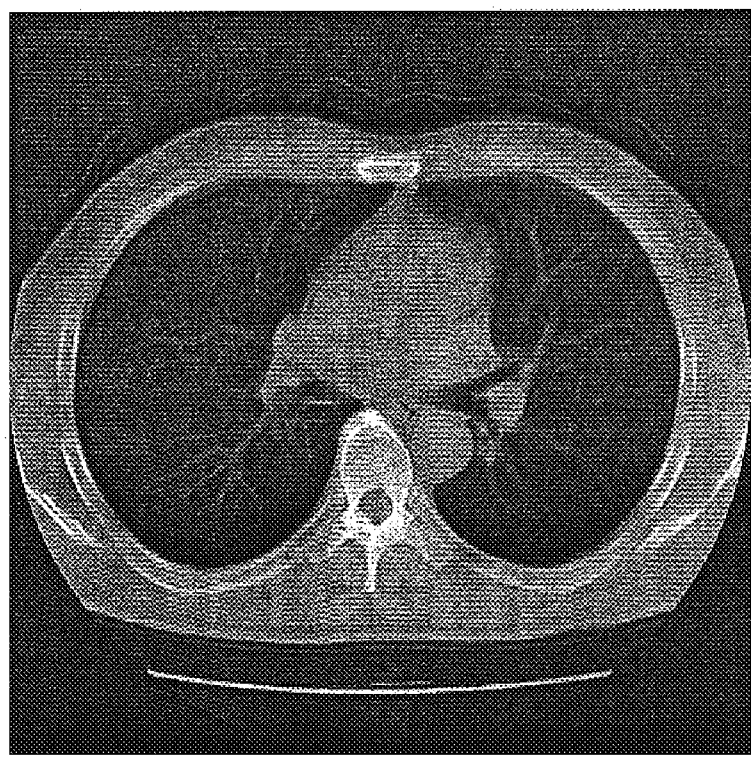

FIG. 7(b) shows the target section image with a subtle lung nodule (arrow), whereas FIGS. 7(a) and (c) show two sections immediately above and below the target section, respectively. The size of this nodule is approximately 6 mm. We initially applied a simple image subtraction technique by using the target section image with the upper or lower section image.

Figure 8:
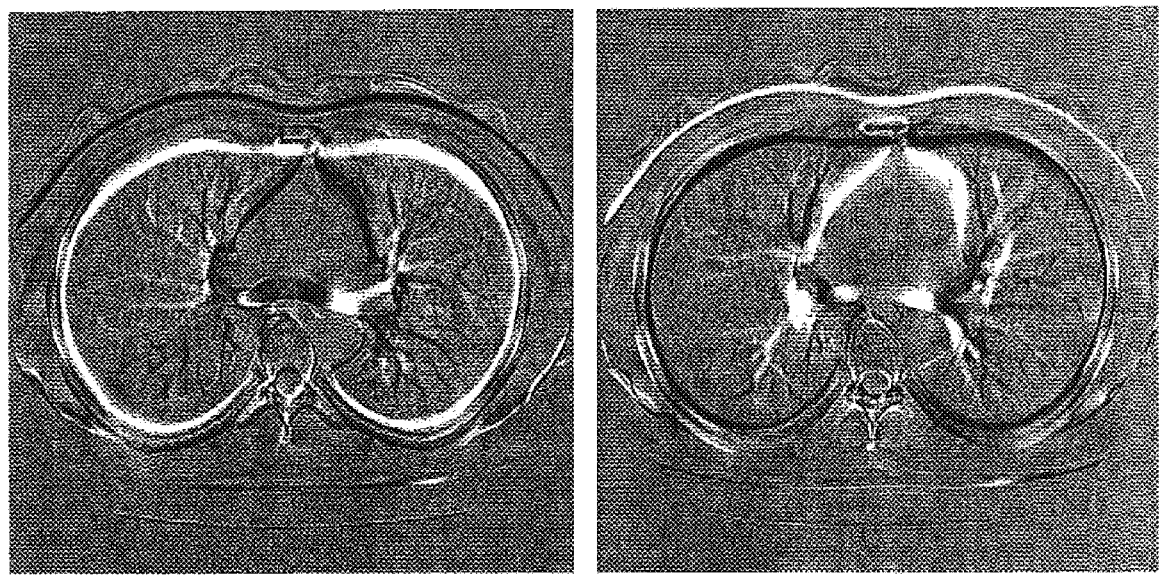
FIGS. 8($a$)–8($b$) shows exemplary subtraction CT images without image warping.
Figure 9:
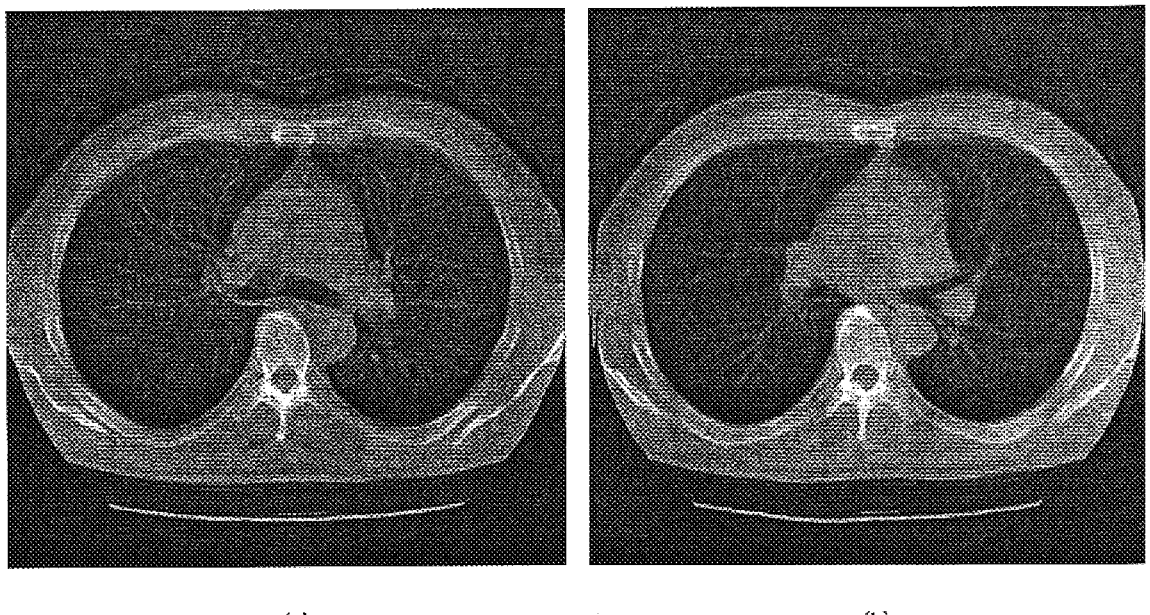
FIGS. 9($a$)–9($b$) shows exemplary warped section images.
Figure 10:
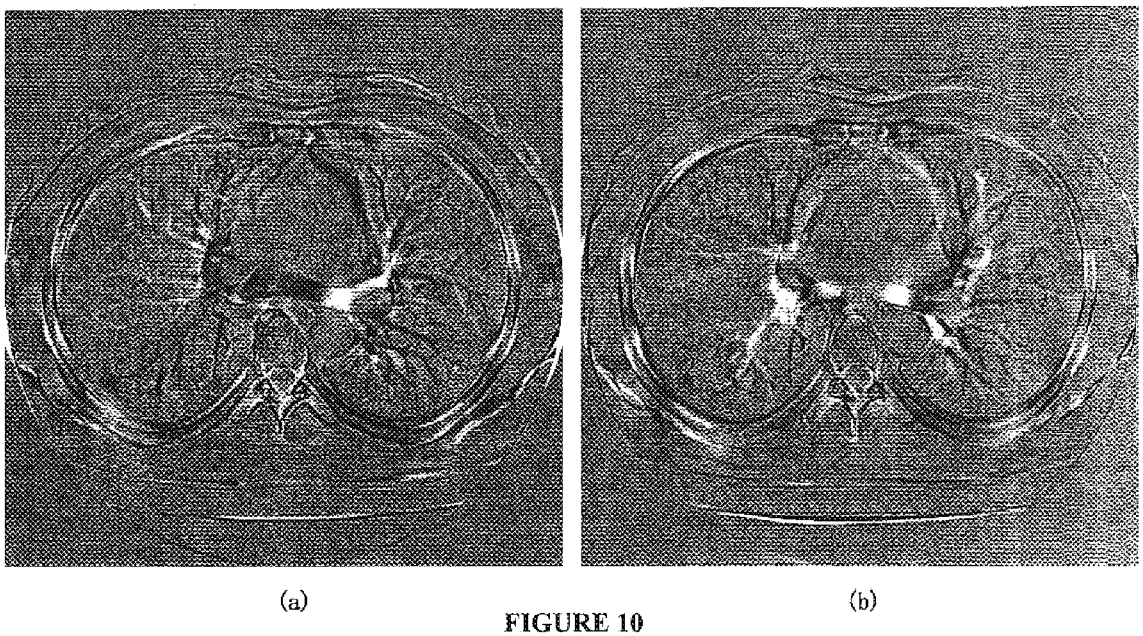
FIGS. 10($a$)–10($b$) shows exemplary subtraction CT images with image warping technique.
Figure 11:
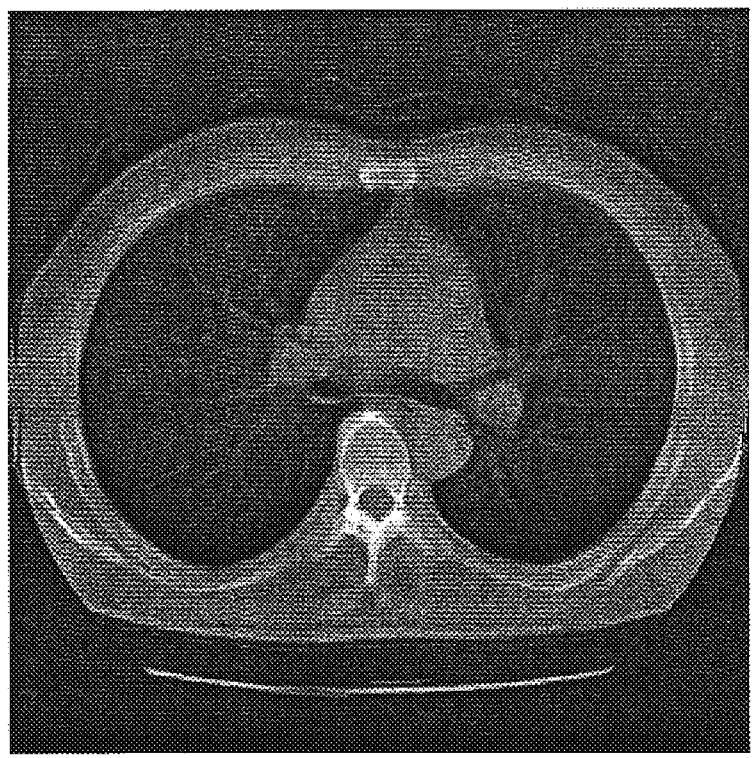
FIG. 11 shows an exemplary mask image obtained by a linear interpolation method.

The subtraction images are obtained by subtraction of the target section image either from the upper section or the lower section image as shown in FIGS. 8(a) and (b), respectively. Note that a small nodule was enhanced as a dark shadow on both subtraction images. However, severe misregistration artifacts are apparent in the subtraction images, mainly due to the differences in pulmonary vessels, lung size, and heart size between the two section images. Accordingly, an iterative image-warping technique for each of the upper and lower section images is performed to match the target section image as thoroughly as possible. The warped upper and lower section images are shown in FIGS. 9(a) and (b), respectively. The subtraction CT images obtained by subtracting of the target section image either from the warped upper section or the warped lower section are shown in FIGS. 10(a) and (b), respectively. By use of the warped section images, the misregistration artifacts in the subtraction CT images are somewhat reduced, but still very noticeable. Therefore, a linear interpolation technique is employed to create a mask image by using the warped upper and the warped lower section images. FIG. 11 shows the mask image obtained by the linear interpolation technique. The subtraction image obtained by use of this mask image is shown later in FIG. 18(a), where the misregistration artifacts at very high or very low pixel values are further reduced.

Embodiments of the present invention relate to a method to create a mask image based on morphological filtering by using a target section image and two section images immediately above and below the target section image. A 3D cylindrical or 2D circular shape kernel was employed for the morphological filter. The kernel size of the 3D cylindrical filter, which is applied to the case of two sections and three sections, is 3(horizontal)×3(vertical)×2(height) and 3(horizontal)×3(vertical)×3(height), respectively. The mask image described below was obtained by use of 3×3×2 cylindrical filter. The kernel size of the 2D circular filter is 3(horizontal)×3(vertical). Because the CT images consist of gray-level pixel values, dilation or erosion corresponds to the replacement of the pixel value with the maximum or minimum value within the kernel, respectively.

The opening operation is performed by the process of 3D erosion followed by 2D dilation, as illustrated in FIG. 5(a). This operation has the effect of eliminating small objects such as small lung nodules. Therefore, opening is useful as the first operation for creating the mask image. The closing operation is performed by the process of 3D dilation followed by 2D erosion, as shown in FIG. 5(a). This operation has the effect of connecting nearby objects. Therefore, the closing operation is useful for maintaining pulmonary vessels in the mask image. Both opening and closing have the effect of smoothing the boundaries of large objects without a significant change in their size. Therefore, the opening followed by the closing operation is an appropriate filter for the creation of the mask image for obtaining the subtraction CT.

FIGS. 12(a) and (b) show 3D erosion filtered images obtained with the target section together with the upper or the lower section in FIGS. 7(a) and (b), respectively. Small pulmonary vessels have disappeared or become thinner. The heart is mainly composed of a small shadow in two section images because of the use of the 3D erosion filter.

Figure 12:
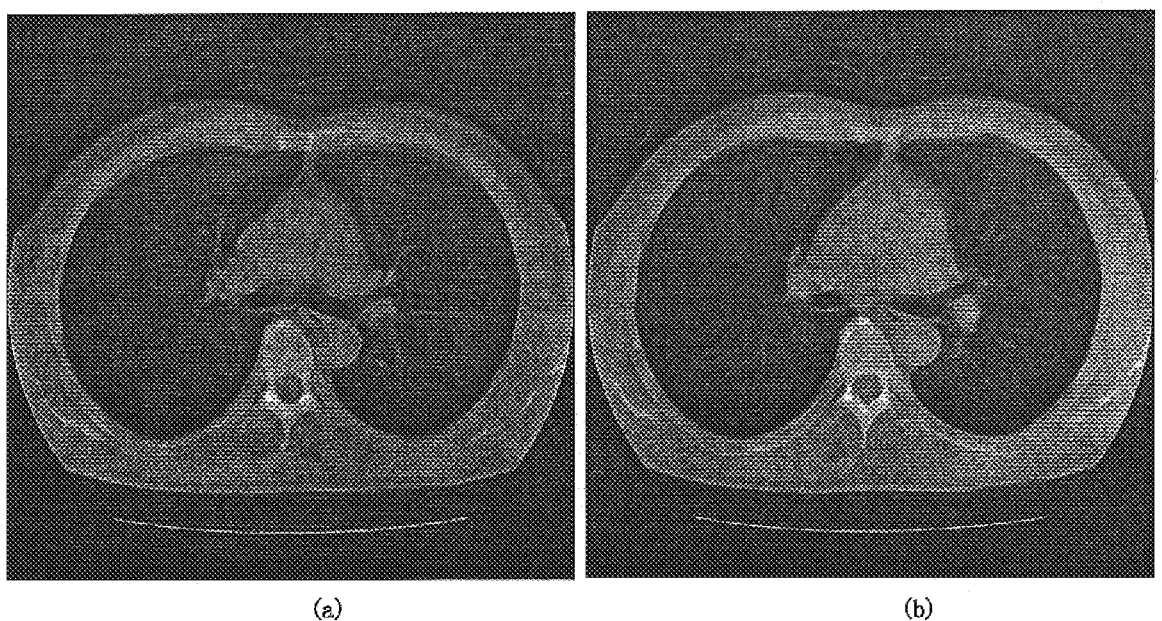
FIGS. 12($a$)–12($b$) shows an exemplary 3D erosion filtered image obtained with a target section together with an upper or a lower section.
Figure 13:
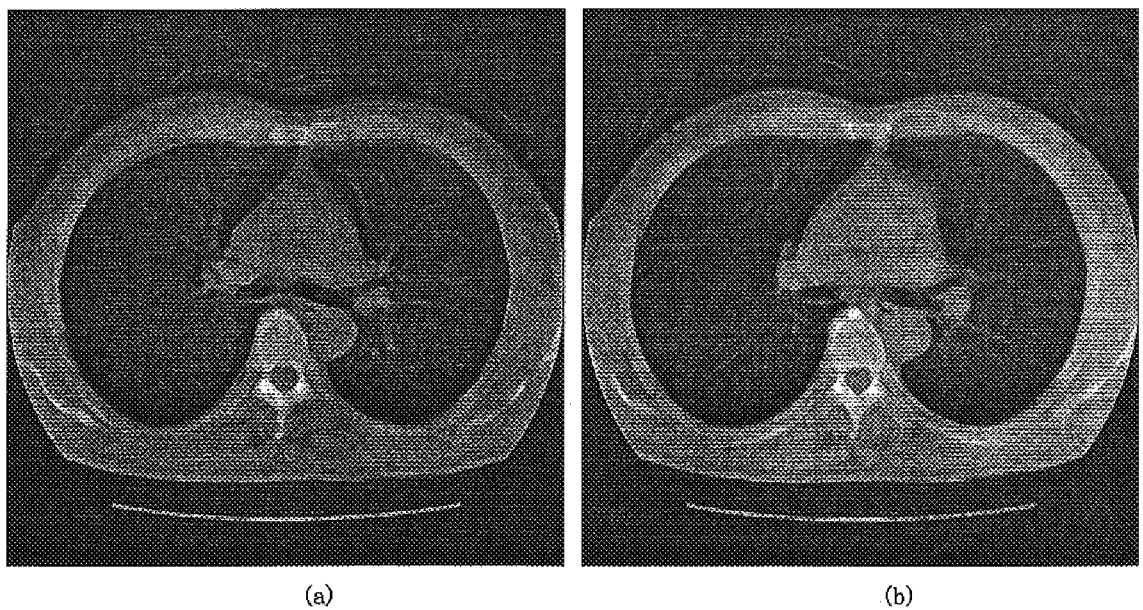
FIGS. 13($a$)–13($b$) shows an exemplary 3D opening filtered intermediate images with a target section image together with an upper or a lower image.
Figure 14:
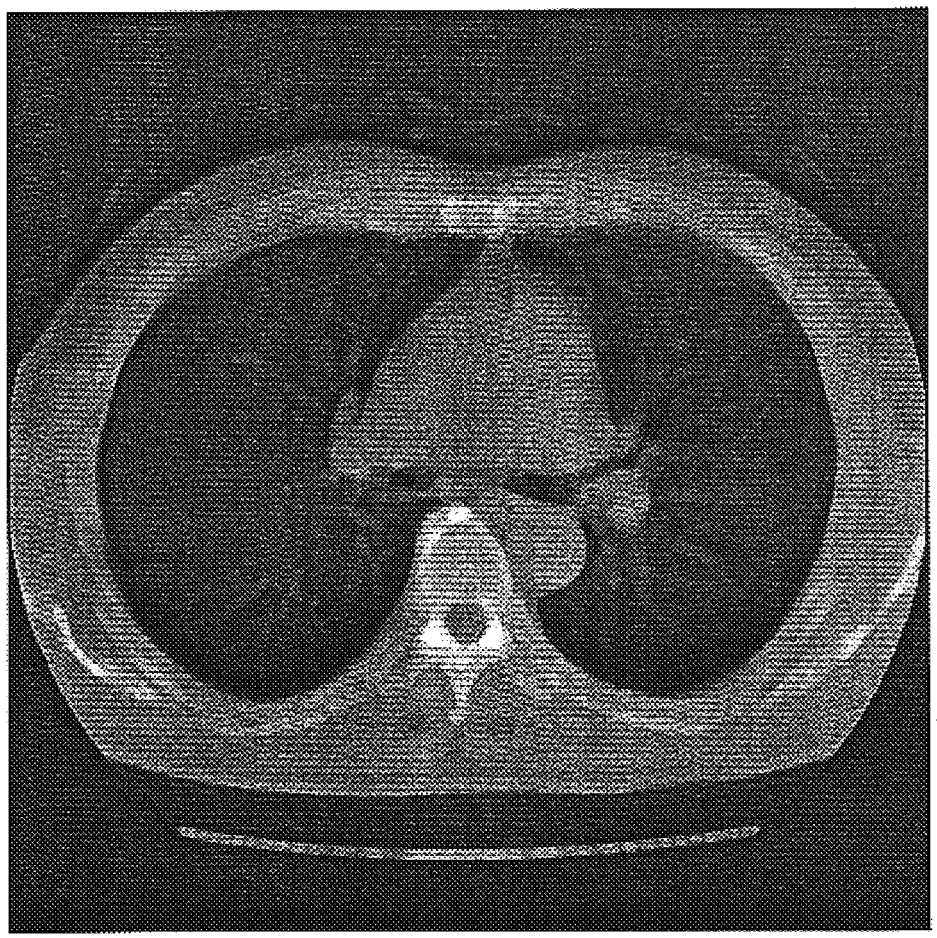
FIG. 14 shows exemplary 3D dilation filtered images obtained with two intermediate images.
Figure 15:
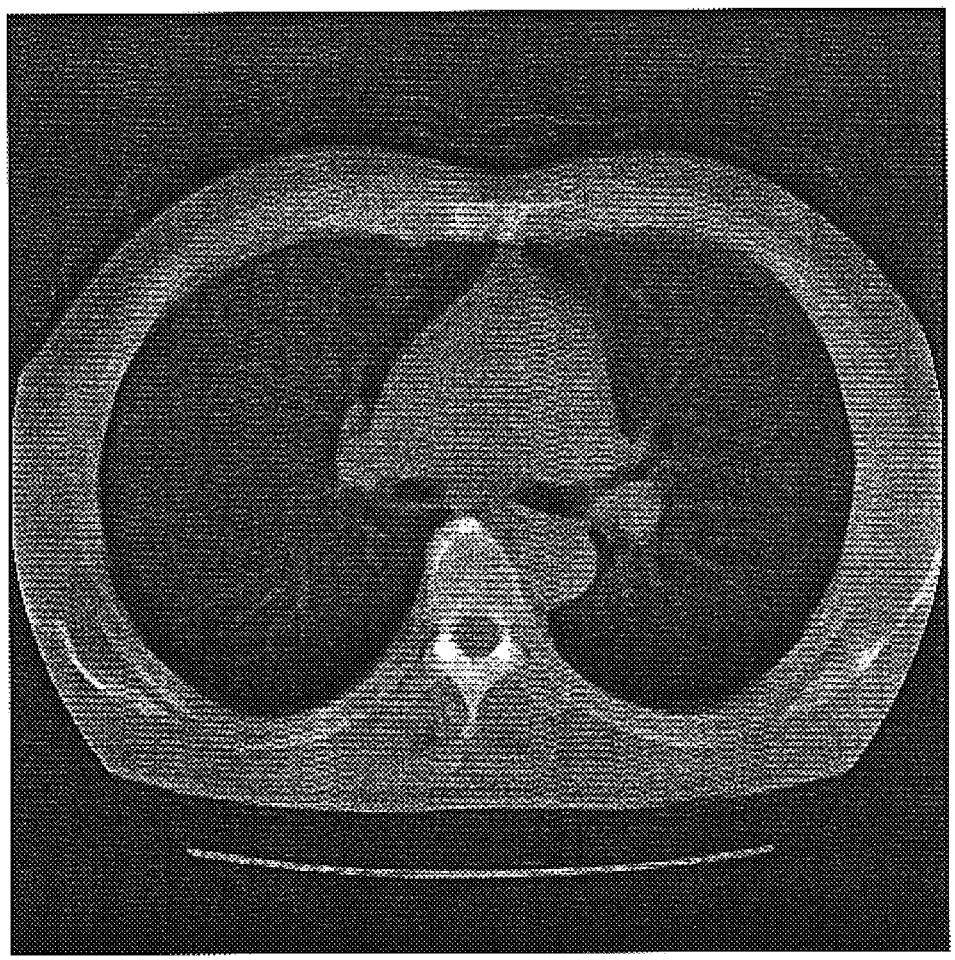
FIG. 15 shows an exemplary mask image obtained from a 2D erosion filter applied to a 3D dilation filtered image.

FIGS. 13(a) and (b) show the upper and the lower intermediate images, respectively, which are 2D dilation filtered images applied to 3D erosion filtered images shown in FIG. 12. Namely, FIGS. 13(a) and (b) show a 3D opening filtered images with a target section image together with an upper or a lower section image, respectively. Thin vessels have disappeared, and the size of the heart is almost the same as the smaller size in one of two section images. Of interest is that the small nodule is removed in the opening filtered intermediate images. It should be noted also that an ideal mask image for subtraction CT technique would include vessel opacities exactly the same as those on the target section image, but does not include pulmonary nodule opacities. In order to combine two opening filtered intermediate images into a mask image, the 3D dilation filtered image as shown in FIG. 14 is obtained with the upper and the lower intermediate images shown in FIG. 13. It should be noted that vessel opacities on the opening filtered intermediate images are retained on the dilation filtered image. FIG. 15 is the mask image obtained by using the 2D erosion filter applied to the 3D dilation filtered image shown in FIG. 14. Namely, FIG. 15 shows the closing filtered image obtained with the two opening filtered intermediate images shown in FIG. 13. It should be noted in FIG. 15 that vessels in the two intermediate images are retained in the mask image, and the small nodule is removed.

Figure 16:
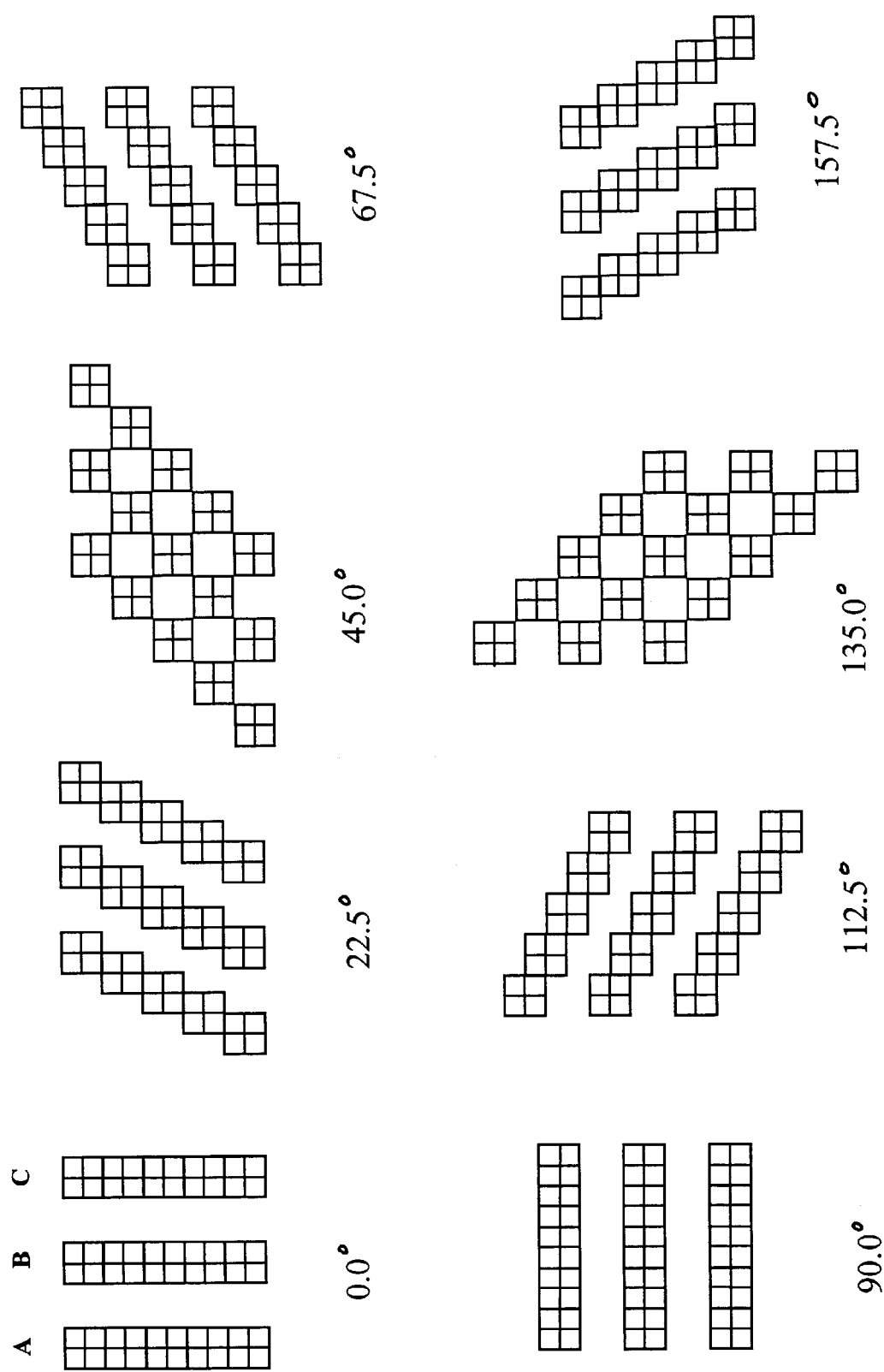
FIG. 16 illustrates line enhancement filters including 8 sets of 3 templates in 8 different directions.

Misregistration artifacts in subtraction CT images occur mainly due to diagonally sectioned vessels, which tend to be linear in shape. The line components is extracted by use of a line enhancement filter on the target section. The detected line components are overlaid on the mask image obtained by morphological filtering. A line enhancement filter may include 8 sets of 3 templates in 8 different directions, as shown in FIG. 16. Each set consists of three parallel templates with an interval between adjacent templates. The output value of the line enhancement filter is defined as follows:

$E_i = 2B_i - A_i - C_i$ when $B_i > A_i$ and $B_i > C_i$, $E_i = 0$ otherwise, $E = \max\{E_i\}$, $i = 1, 2, 3, 4, 5, 6, 7, 8$, where $A_i$, $B_i$, and $C_i$ are the summation of all pixel values in each template of a set. The maximum value E, obtained from the outputs of the sets is the final output value of the line enhancement filter. Candidates of the line component are then identified when the output value of the line enhancement filter is larger than a predetermined threshold level.

It is difficult to detect both hilar and peripheral vessels by using a set of fixed parameters for the line enhancement filter, i.e., length, width of the templates, and the interval between the templates, because the size of the vessels changes considerably. Therefore, these parameters were varied depending on the distance between the center of the template and the center of the section image.

Figure 17:
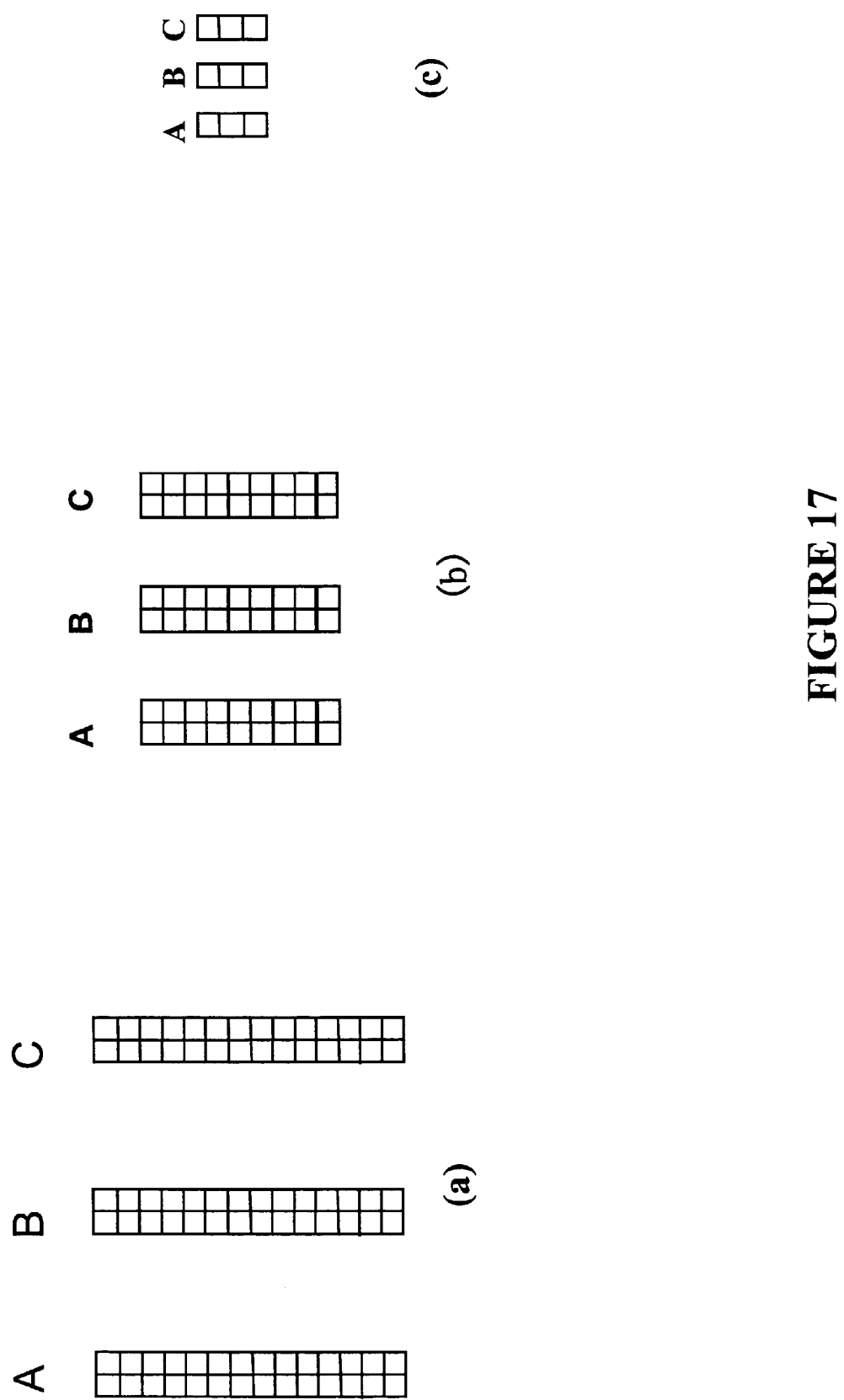
FIGS. 17($a$)–17($c$) illustrates parameters of the line enhancement filters used at different locations in lungs from the hilar area near the center of the section image to the peripheral area.

FIGS. 17(a) and (c) show a line enhancement filter used at the hilar area near the center of the section image, where vessels tend to be large, and in the peripheral area near the pleura, respectively, where vessel sizes are very small. The parameters are changed linearly in proportion to the distance from the hilar to the peripheral area, as illustrated in FIGS. 17(a), (b) and (c).

In embodiments of the present invention, an iterative image-warping technique based on analysis of the cross-correlation values on many regions of interest (ROIs) which are placed on the target section image and the mask image is employed to obtain a subtraction CT image. This technique can reduce artifacts due to normal structures extended over multiple section images. In this technique, first, a number of template ROIs (32×32 matrix) and the corresponding search area ROIs (64×64 matrix) are selected from the mask and the target section image, respectively. The shift values, x and y, for all pairs of selected ROIs are determined by use of a cross-correlation technique for finding the best-matched locations in the mask and target images. A two-dimensional surface fitting by use of polynomial functions was then applied to each set of mapped shift values, x and y, for conversion of the x, y coordinates of the mask image, which corresponds to warping of the mask image. The warped masked image is then used for the second warping for further reduction of misregistration artifacts. Finally, the subtraction CT image is obtained by subtraction of the target image from the iteratively warped mask image.

In embodiments of the present invention, computerized detection of nodules on the subtraction CT image, a gray-level thresholding and the gray-level histogram analysis by use of a predetermined threshold value for lung segmentation and feature analysis of a blurred target section image are performed. A number of small holes in the segmented lung area due to vessels can be reduced by use of a blurred target section image which is obtained by Gaussian filtering with a 15×15 matrix size and a SD of 8 pixels. For the segmentation of the lungs, we determined the threshold level by using a gray-level histogram for the target image, as described below. The histogram of the blurred target section image tends to have two peaks; one is due to the lungs and direct exposure, and the other is due to skin, heart, and muscle. Therefore, we determined a threshold level at a valley of the histogram. If small regions are included in the extracted lung area, these regions are eliminated. Furthermore, the boundaries of the segmented lungs were smoothed by a circular morphological closing filter with a diameter of 21 pixels. By using the segmented lung, elimination of nodule candidates outside the lung area can be accomplished. The thresholding technique is then applied for identifying candidates of lung nodules included in the segmented lungs.

In order to reduce false positives, feature analysis based on a rule-based method and linear discriminant analysis (LDA) is employed. For the determination of proper thresholding levels for reduction of false positives, the features for all candidates which are included in 10 section images with lung nodules in the database are analyzed. For rule-based feature analysis, the area, the circularity, the average pixel value, and the SD of pixel values of the subtraction CT image, as well as the average pixel value and the SD of the pixel values of the conventional CT image were used. However, one of ordinary skill in the art would realize the use of alternate features.

For reduction of false positives in the computerized detection of lung nodules on conventional CT, the area, the circularity, the average pixel value, and the SD of pixel values for feature analysis are analyzed. Each candidate is classified into nodule or non-nodules by a rule-based classification method with predetermined thresholding levels. In order to reduce false positives further, LDA can be used to distinguish between nodules and false positives.

Figure 18:
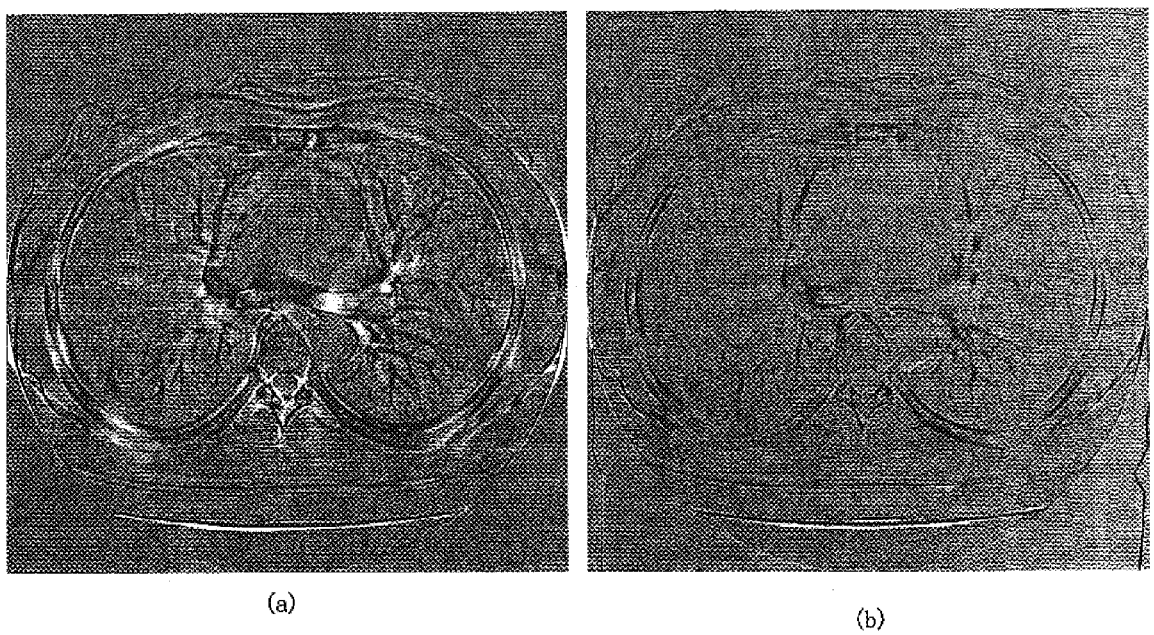
FIGS. 18($a$)–18($b$) shows exemplary subtraction CT images.

FIG. 18(a) shows a subtraction CT image obtained by subtracting of the target image from the mask image which is derived by the linear interpolation method with the section immediately above and below the image. Misregistered artifacts due to vessels in the subtraction CT image are apparently less than those in the subtraction CT images in FIGS. 10(a) and 10(b). FIG. 18(b) shows a subtraction CT image obtained by morphological filtering with the target section image and the sections immediately above and below the target image. Both subtraction CT images in FIG. 18 clearly enhanced the subtle nodule at the right lower lung near the pleura. It should be noted that the image quality for the subtraction CT obtained by use of the morphological filter is superior to that by the linear interpolation technique. This is because the mask image obtained by the morphological filter can include pulmonary vessels on the target section image, and thus most vessels can be removed by the subtraction.

Figure 19:
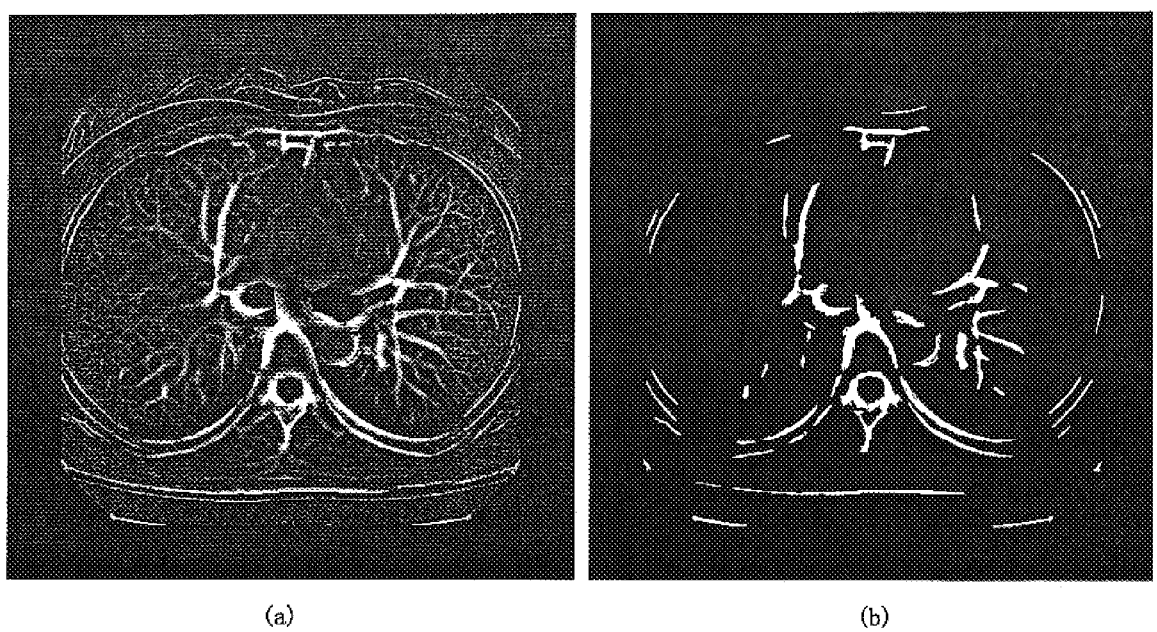
FIGS. 19($a$)–19($b$) shows examples of line enhancement filtering.

In order further to reduce the remaining misregistration artifacts due to vessels, a line enhancement filter was used to extract vessels. An enhanced line image is shown in FIG. 19(a). Because a series of variable parameters was used for the line enhancement filter, detected vessels at the hilar area tend to be large, and those at the peripheral area tend to be small. The vessels were extracted by thresholding with a predetermined threshold level applied to the line enhancement image. In addition, the area and the circularity for all patterns detected by thresholding were determined so that round or circular components were eliminated. The final line components obtained by the line enhancement filter are illustrated in FIG. 19(b), where the line components such as vessels and ribs are included in the image.

Figure 20:
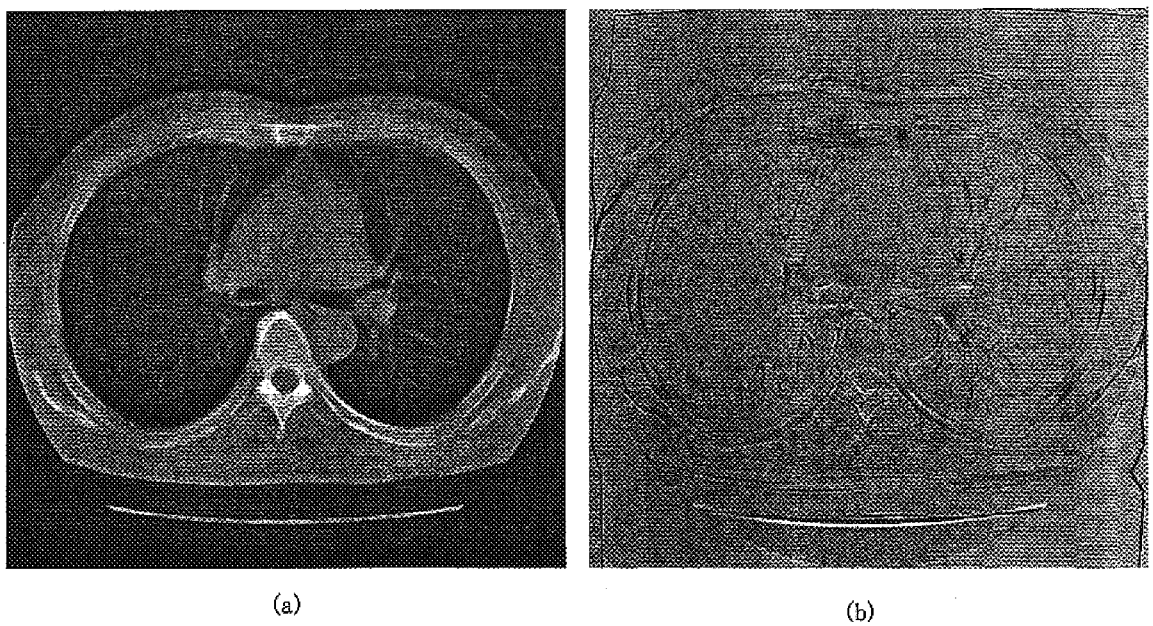
FIGS. 20($a$)–20($b$) shows an example of opening followed by closing filtered image with line components obtained with line enhancement filter.

The pixel values of the target section image over the areas of the detected line components are then applied to replace the pixel values over the same areas in the mask image, which is obtained by the morphological filtering technique. The resulting mask image is shown in FIG. 20(a). The subtraction CT image obtained by subtraction of the target section image from the mask image plus line components is shown in FIG. 20(b). It is noted that the small nodule remains as dark shadows, and the misregistration artifacts were considerably reduced compared to the subtraction CT images obtained either by the linear interpolation method (FIG. 18(a)) or by the morphological filtering method without detected line components (FIG. 18(b)). The subtraction CT images as supplemental images or as a second opinion may be useful to radiologists for their image reading of conventional CT images for detection of small and subtle lung nodules.

Figure 21:
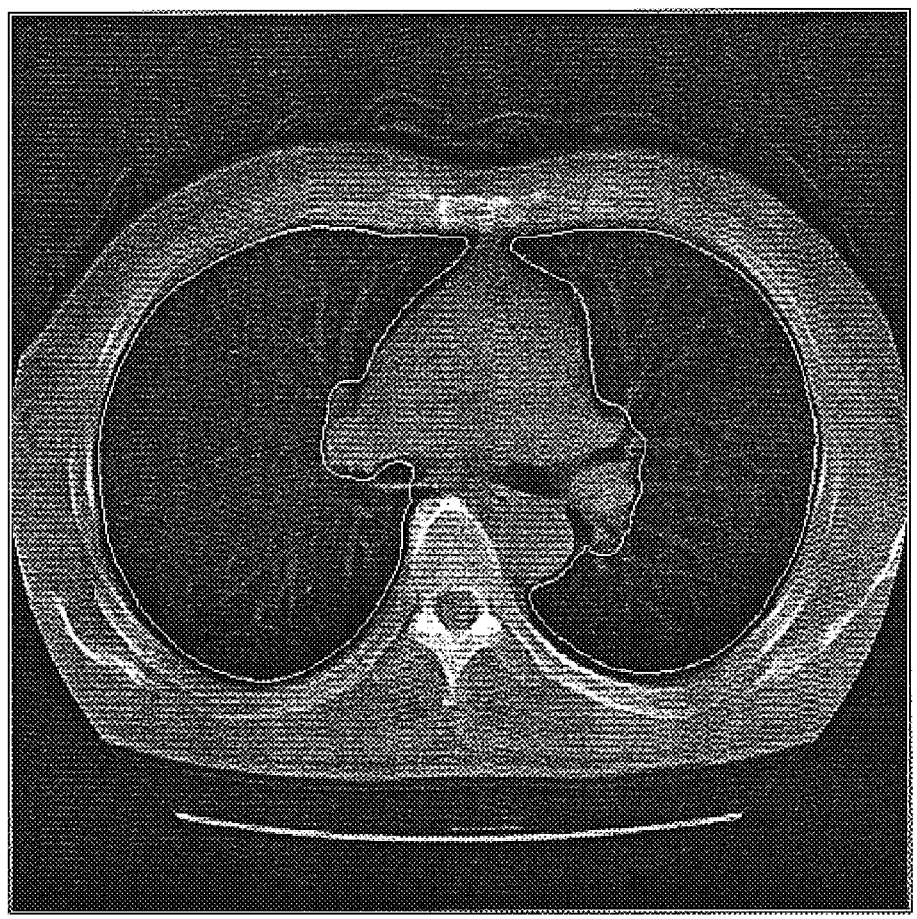
FIG. 21 shows an exemplary lung segmentation.
Figure 22:
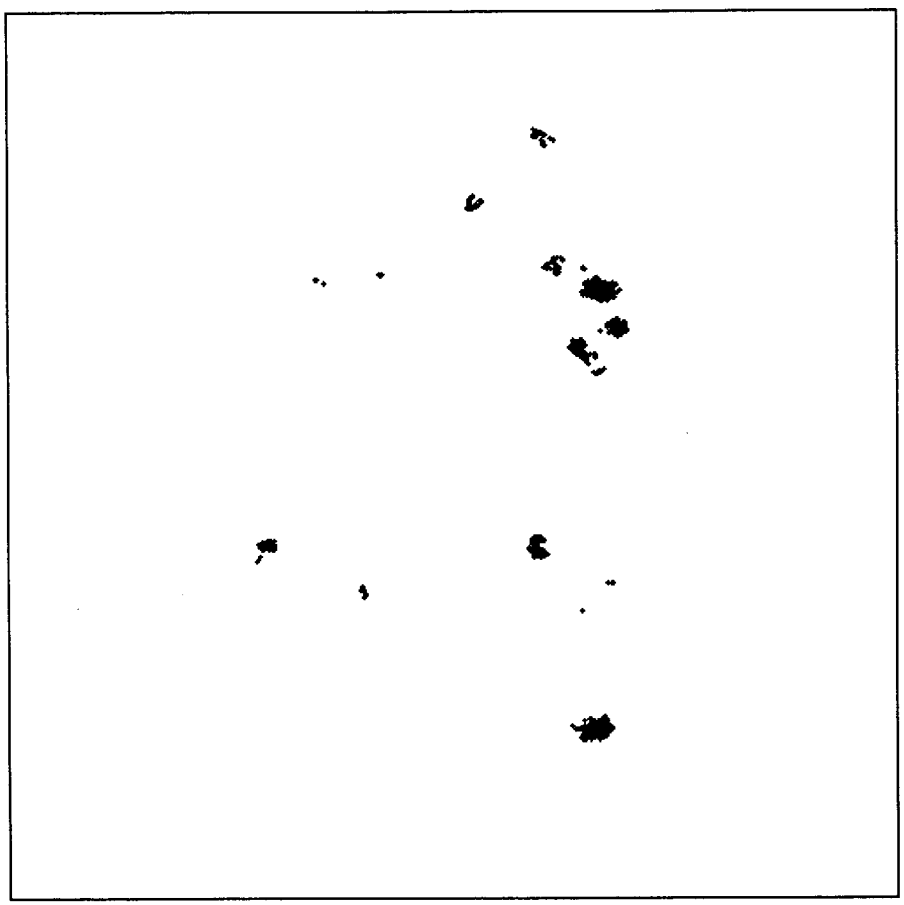
FIG. 22 illustrates exemplary initial nodule candidates detected by thresholding of subtraction CT.

For the computerized detection of lung nodules on the subtraction CT image, initially gray-level thresholding was performed with a predetermined threshold value. Next, a lung segmentation based on the gray-level histogram analysis and feature analysis of the blurred target CT image was performed for extraction of lung regions. FIG. 21 shows the segmentation result for the target section image, where white lines indicate the border of the lungs. Thus, the initial nodule candidates outside the lung area can be eliminated. FIG. 22 shows the initially detected nodule candidates.

Figure 23:
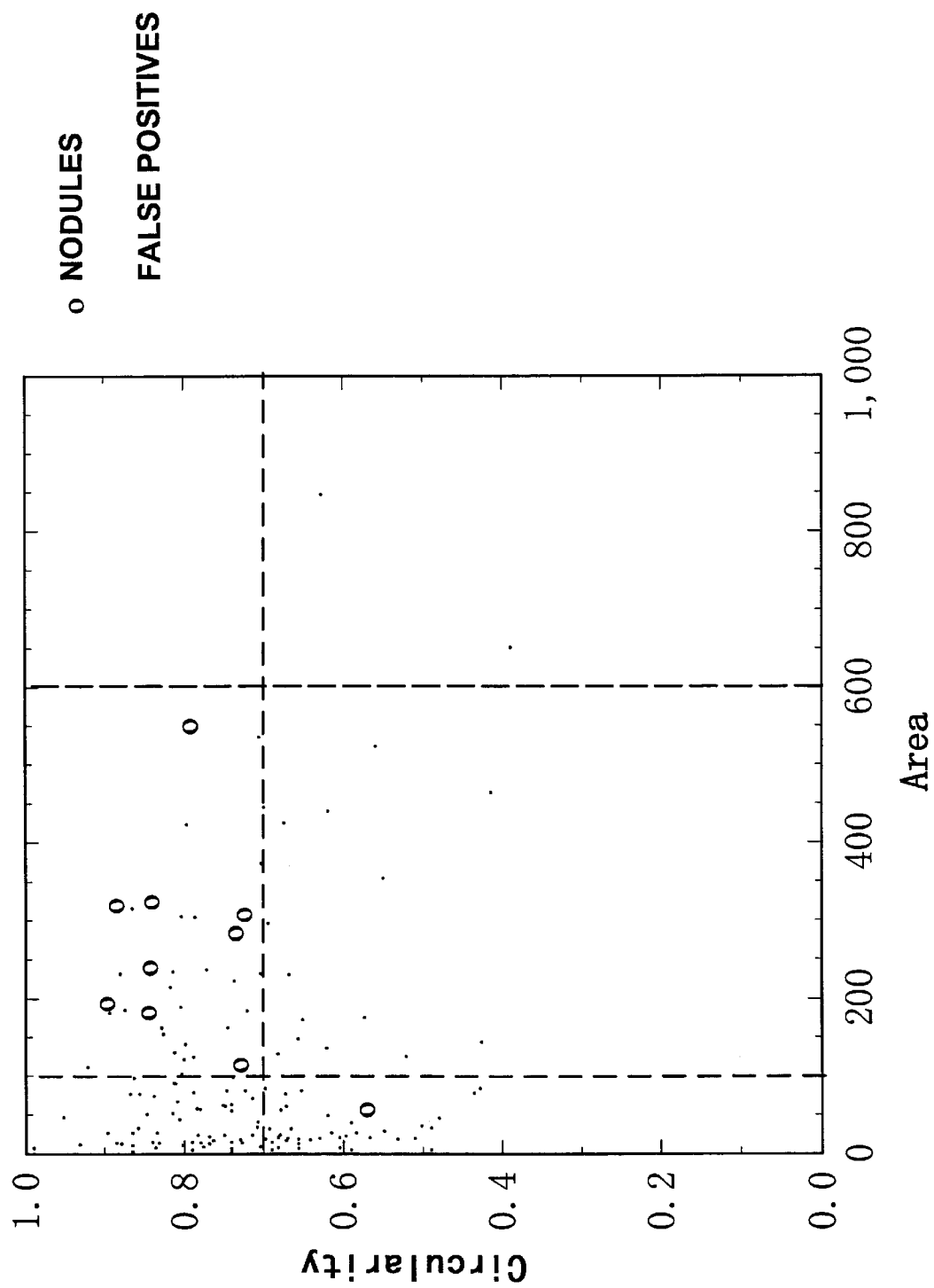
FIG. 23 shows an exemplary relationship between area and circularity for detected candidates.
Figure 24:
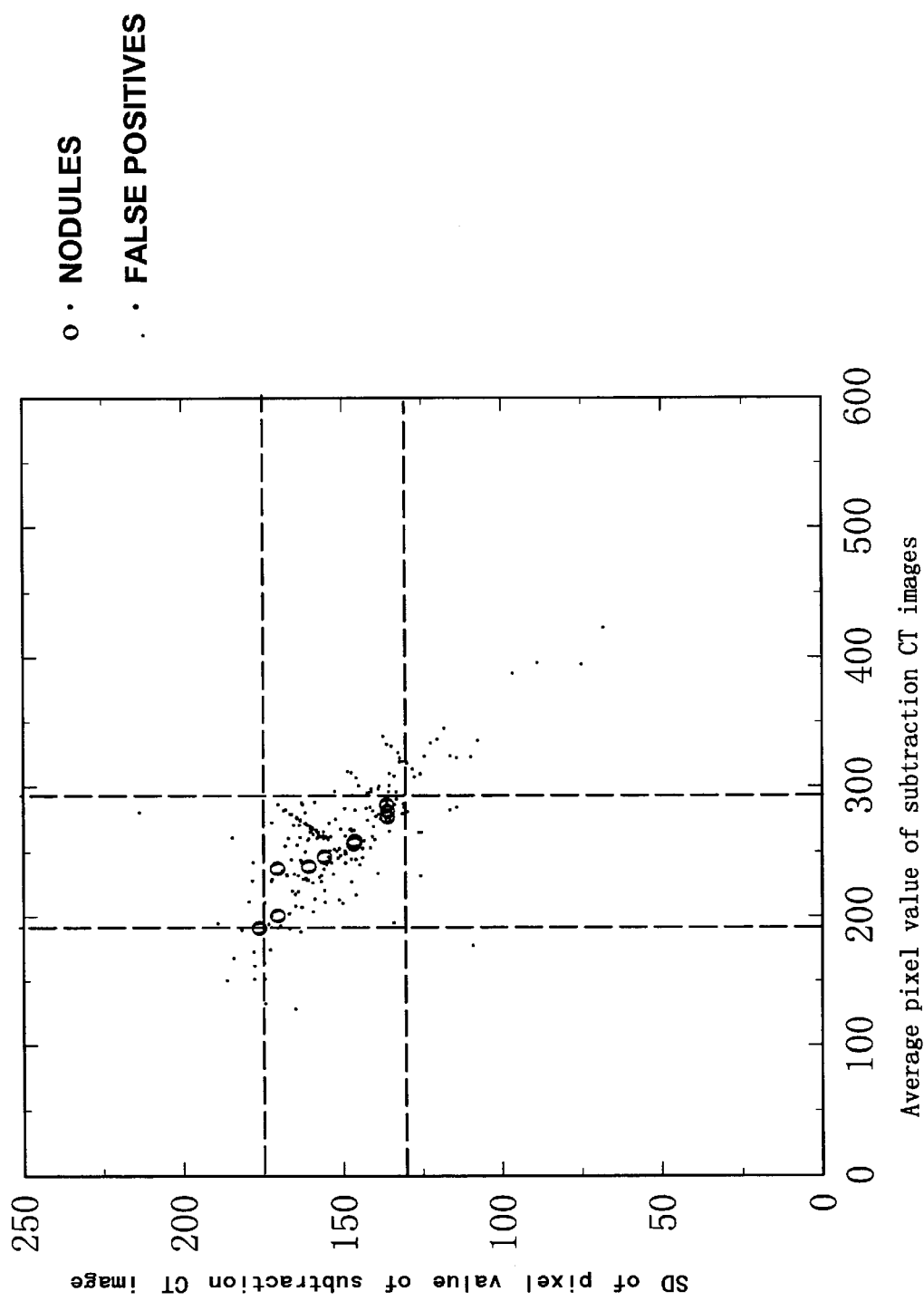
FIG. 24 shows an exemplary relationship between average pixel value and SD of detected candidates in a subtraction CT.
Figure 25:
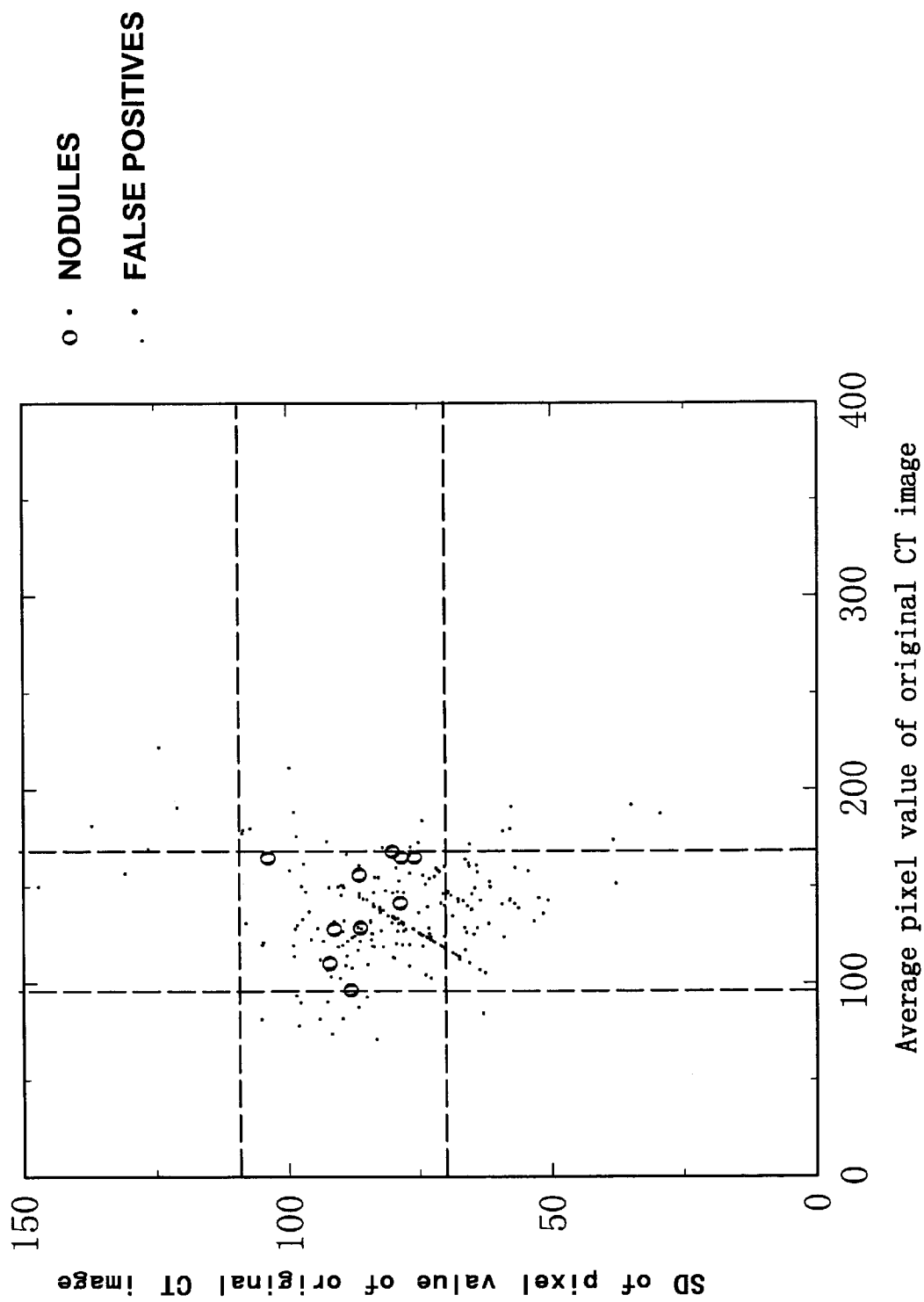
FIG. 25 shows an exemplary relationship between average pixel value and SD of detected candidates in an original CT.
Figure 26:
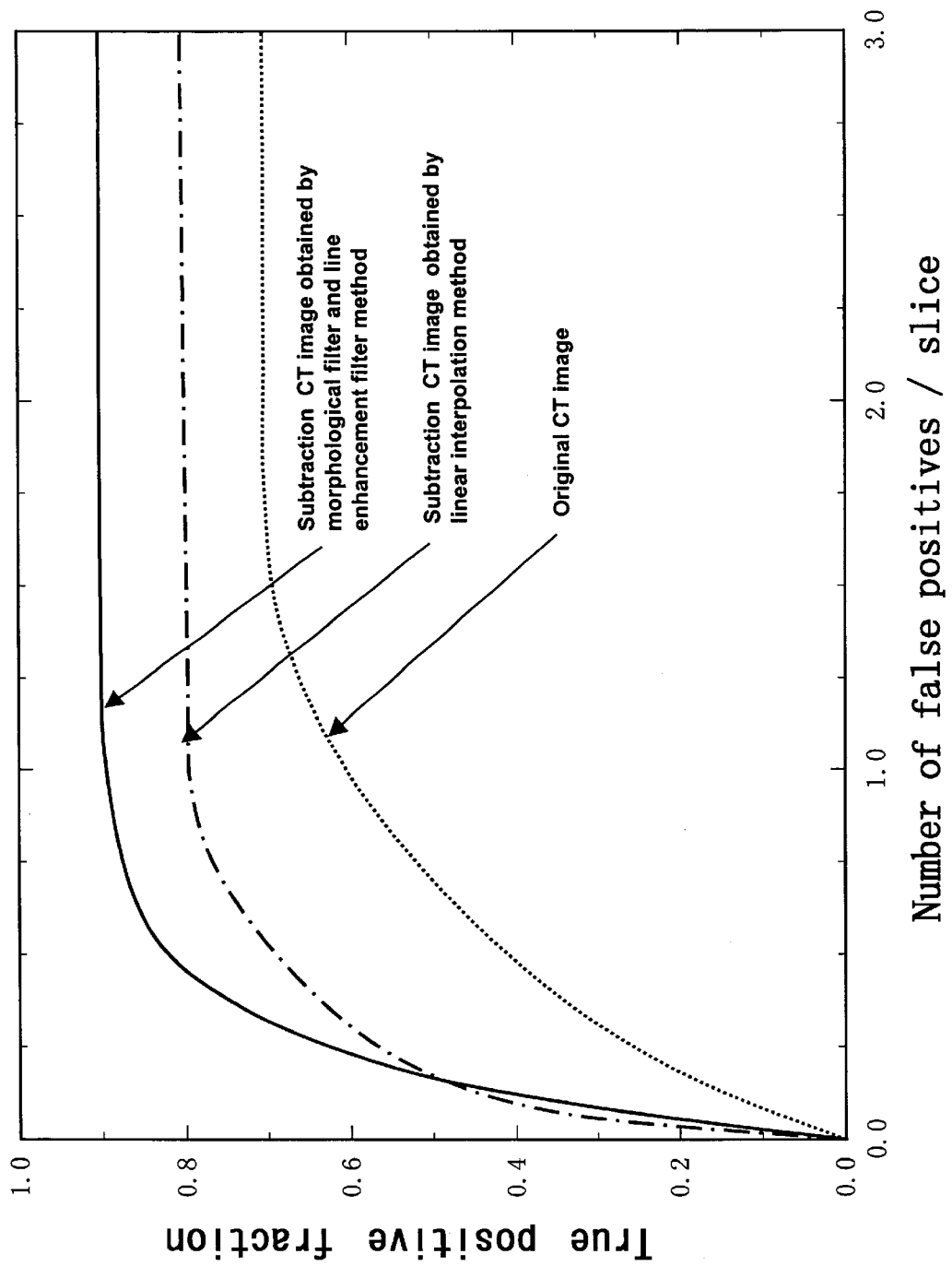
FIG. 26 shows FROC curves for the detection of lung nodules in original CT and subtraction CT image.

The features of the detected nodule candidates are determined for reduction of false positives. The relationship between the area and the circularity of all candidates in 10 section images is shown in FIG. 23. It is apparent in FIG. 23 that many false positives have very small or very large areas or small circularities, which can be eliminated as false positives by use of three dashed lines. The relationship between the average and the SD of pixel values for subtraction CT images and conventional CT images for nodule candidates are shown in FIGS. 24 and 25, respectively. Some false positives tend to have a very low or very high average pixel value, or a very low or very high SD for both subtraction CT images and CT images, as indicated by the dashed lines in the FIGS. 24 and 25, respectively, and thus can be eliminated. By use of the subtraction CT obtained from the morphological filtering plus the line enhancement filtering with the rule-based false-positive reduction, the sensitivity for the computerized detection of small nodules was 90% at a false positive rate of 1.0 per image. By use of the LDA method, the overall performance of this detection scheme was slightly improved to 90% sensitivity with a 0.85 false-positive rate per image. The overall performance for computerized detection of lung nodules was compared based on three methods, which include conventional CT images, subtraction CT images obtained by linear interpolation, and by the morphological plus the line enhancement filtering technique. FROC curves obtained by varying a threshold level for the outputs from the LDA are shown in FIG. 26. It is apparent in FIG. 26 that subtraction CT with the morphological plus the line enhancement filtering technique provided a higher performance compared to the other two methods, much better than conventional CT.

The Applicants investigated the computerized detection of lung nodules in thin-section CT images with slice thicknesses of 7.5 mm, 2.5 mm, and 1.5 mm. In thin slice CT, the multiple-section images usually include lung nodules, and the shapes of the vessels tend to be similar in the adjacent sections for the thin-slice CT image. Therefore, we employed the mask image obtained by morphological opening filtering with the target section image, the upper and the lower section images as described earlier. To reduce misregistration artifacts due to vessels, we also used the line enhancement filtering technique. The result indicated that subtle or very subtle lung nodules were clearly enhanced in the subtraction CT images. It should be noted that a large size kernel such as 3×3×N for 3D morphological filtering technique can be used for creation of the mask image to provide the subtraction CT for thin slice CT images which are obtained by use of a multi-detector row CT, where N is the number of section images (larger than 3) depending on the slice thickness and the nodule size. Alternatively, a small size kernel such as 3×3×2 can be applied to a set of CT images which are obtained by subsampling or averaging thin slice CT images at a large slice interval such as 5 mm and 10 mm.

This invention conveniently may be implemented using a conventional general purpose computer or micro-processor programmed according to the teachings of the present invention, as will be apparent to those skilled in the computer art. Appropriate software can readily be prepared by programmers of ordinary skill based on the teachings of the present disclosure, as will be apparent to those skilled in the software art.

Figure 27:
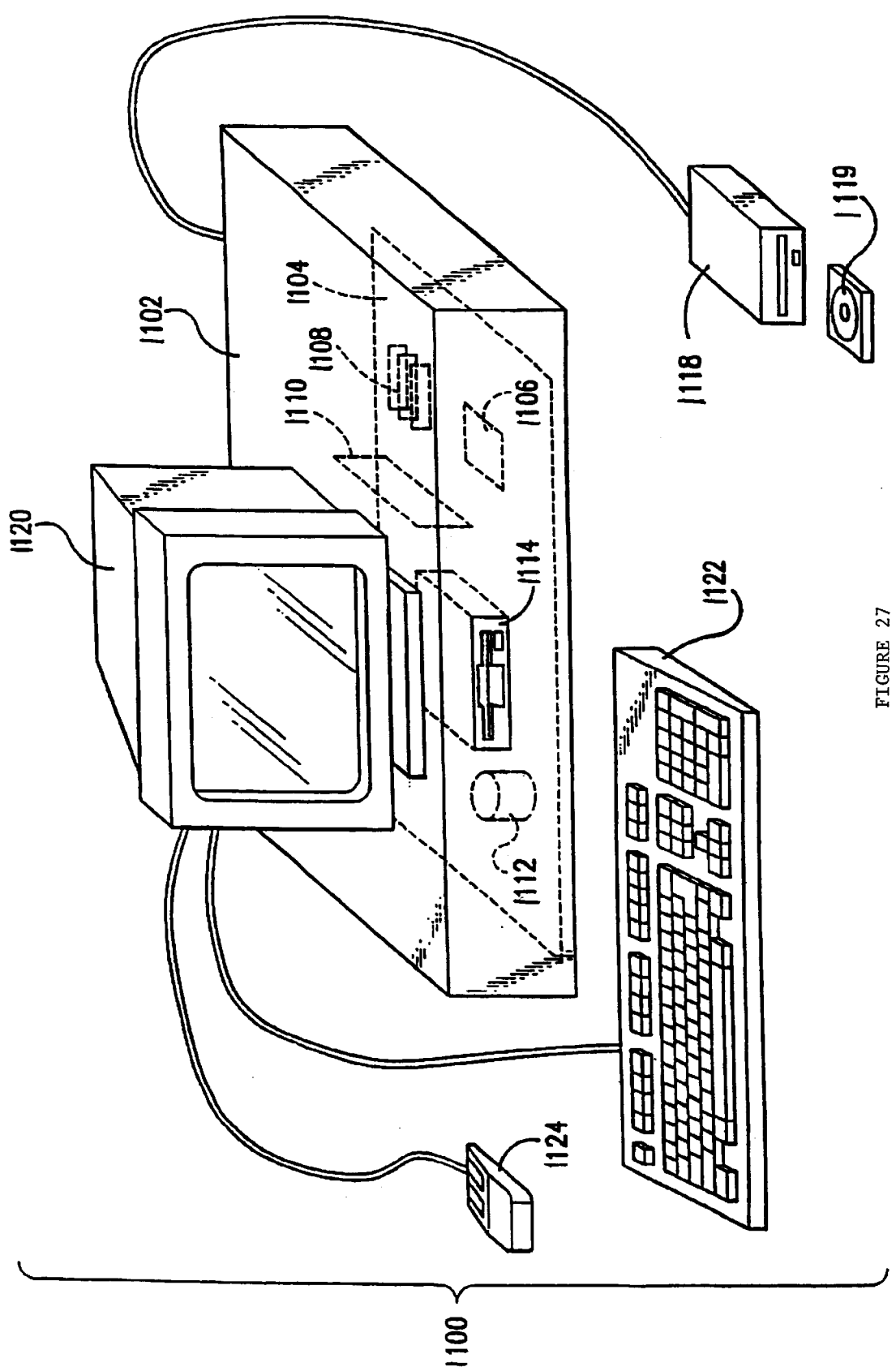
FIG. 27 illustrates a schematic illustration of a computer system for the computerized detection of pulmonary nodules.

FIG. 27 is a schematic illustration of a computer system for the computerized detection of pulmonary nodules. A computer 1100 implements the method of the present invention, wherein the computer housing 1102 houses a motherboard 1104 which contains a CPU 1106, memory 1108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 1100 also includes plural input devices, (e.g., a keyboard 1122 and mouse 1124), and a display card 1110 for controlling monitor 1120. In addition, the computer 1100 further includes a floppy disk drive 1114; other removable media devices (e.g., compact disc 1119, tape, and removable magneto-optical media (not shown)); and a hard disk 1112, or other fixed, high density media drives, connected using an appropriate device bus (e.g., a SCSI bus, an Enhanced IDE bus, or a Ultra DMA bus). Also connected to the same device bus or another device bus, the computer 1100 may additionally include a compact disc reader 1118, a compact disc reader/writer unit (not shown) or a compact disc jukebox (not shown). Although compact disc 1119 is shown in a CD caddy, the compact disc 1119 can be inserted directly into CD-ROM drives which do not require caddies.

As stated above, the system includes at least one computer readable medium. Examples of computer readable media are compact discs 1119, hard disks 1112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 1100 and for enabling the computer 1100 to interact with a human user. Such software may nclude, but is not limited to, device drivers, operating systems and user applications, such as development tools. Such computer readable media further includes the computer program product of the present invention for performing the inventive method of disclosed above. The computer code devices of the present invention can be any interpreted or executable code mechanism, including but not limited to scripts, interpreters, dynamic link libraries, Java classes, and complete executable programs. Moreover, parts of the processing of the present invention may be distributed for better performance, reliability, and/or cost. For example, an outline or image may be selected on a first computer and sent to a second computer for remote diagnosis.

The invention may also be implemented by the preparation of application specific integrated circuits or by interconnecting an appropriate network of conventional component circuits, as will be readily apparent to those skilled in the art.

Numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for computerized detection of lung nodules in CT section images, comprising the following steps:
    warping a first CT section image to match a second CT section image;
    warping a third CT section image to match the second CT section image;
    creating a mask image by linear interpolation of the warped first CT section image and the warped third CT section image;
    subtracting the mask image from the second CT section image to from a subtraction image; and
    detecting small lung nodules based on the subtraction image.

2. The method of claim 1, wherein:
    the first, second, and third CT section images are part of sequential series on CT section images;
    the first CT section image is prior to the second CT section image; and
    the third CT section image is subsequent to the second CT section image.

3. The method of claim 2, wherein the first and third CT section images are both adjacent to the second CT section.

4. The method of claim 1, comprising the further step of warping the mask image to match the first and third warped CT section images.

5. The method of claim 1, comprising the further step of warping the mask image to match the first warped CT section image.

6. The method of claim 1, comprising the further step of warping the mask image to match the third warped CT section image.

7. A method for computerized detection of small lung nodules in CT section images, comprising the following steps:
    creating a morphological filtered image from at least first, second, and third CT section images comprising the steps of: forming a first 3-D erosion image by eroding the first and second CT section images;
    Forming a first 2D dilution image by diluting the 3D erosion image;
    Forming a second 3D erosion image by eroding the second and third Ct section images;
    Forming a second 2D dilution image by diluting the second 3D erosion image;
    Forming a 3D dilution image by diluting the first and second 2D dilution images;
    Forming the morphological filtered image by eroding the 3D dilution image;
    creating a mask image from the morphological filtered image;
    subtracting the mask image from the second CT section image to form a subtraction image; and
    detecting small lung nodules based on the subtraction image.

8. The method of claim 7, wherein:
    the first, second, and third CT section images are part of sequential series of CT section images;
    the first CT section image is prior to the second CT section image; and
    the third CT section image is subsequent to the second CT section image.

9. The method of claim 8, wherein the first and third CT section images are adjacent to the second CT section image.

10. The method of claim 7, comprising the further steps of:
    detecting the line components of the second image; and
    replacing at least one section of the second image having detected line components by corresponding at least one section of the morphological filtered image.

11. A computer readable medium storing computer program instructions for computerized detection of lung nodules in CT section images, which when used to program a computer cause the computer to perform any one of the steps of claims 1–7 and 8–10.

12. A system for implementing the method recited in any one of claims 1–7 and 8–10.

13. An apparatus arranged computerized detection of lung nodules in CT section images comprising:
    a means for warping a first CT section image to match a second CT section image;
    a means for warping a third CT section image to match the second CT section image;
    a means for creating a mask image by linear interpolation of the warped first CT section image and the warped third CT section image; and
    a means for subtracting the mask image from the second CT section image.

* * * * *